(12) United States Patent
Okitsu et al.

(10) Patent No.: US 6,394,894 B1
(45) Date of Patent: May 28, 2002

(54) GAME DEVICE, COLLISION DETERMINATION METHOD AND INFORMATION STORING MEDIUM

(75) Inventors: Yoshiyuki Okitsu; Toyoji Kurose, both of Tokyo; Jun Okubo, Fujisawa; Tomoko Hasegawa, Tokyo, all of (JP)

(73) Assignee: Kabushiki Kaisha Sega Enterprises, Tokyo (JP)

( * ) Notice: Subject to any disclaimer, the term of this patent is extended or adjusted under 35 U.S.C. 154(b) by 0 days.

(21) Appl. No.: 09/408,840

(22) Filed: Sep. 30, 1999

(30) Foreign Application Priority Data

Sep. 30, 1998 (JP) .......................... 10-278919
Sep. 16, 1999 (JP) .......................... 11-262755

(51) Int. Cl.$^7$ ................................ A63F 13/00
(52) U.S. Cl. ................ 463/3; 463/7; 463/31; 463/43

(58) Field of Search .................... 463/1–8, 30, 31, 463/40–44

(56) References Cited

U.S. PATENT DOCUMENTS

RE33,662 E  *  8/1991  Blair et al.
6,183,363 B1 *  3/2001  Ishihara et al.
6,270,413 B1 *  8/2001  Aikawa et al.

* cited by examiner

*Primary Examiner*—Michael O'Neill
(74) *Attorney, Agent, or Firm*—Finnegan, Henderson, Farabow, Garrett & Dunner, L.L.P.

(57) ABSTRACT

A baseball game is provided which imitates reality more closely by reflecting player data in game characters. Data relating to good hitting courses and bad hitting courses for each batter are incorporated as batter parameters, and the selection of a good or bad course by the batter can be reflected in the result of a hit, by varying the size of a collision object, or the like, in accordance with the batter parameters.

13 Claims, 27 Drawing Sheets

FIG.19

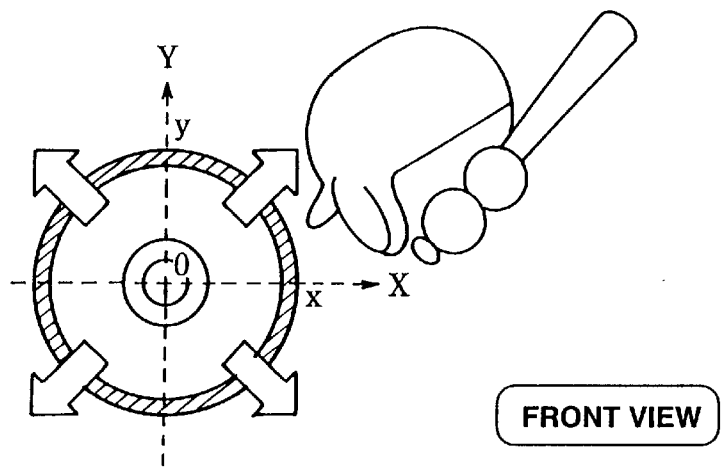

FRONT VIEW

FIG.20

| HIT JUDGEMENT | DIRECTION OF HIT BALL |
|---|---|
| POSSIBLE HITTING REGION $x > 0$ | LIABLE TO FLY RIGHT MOVE TO FIELD SCREEN |
| POSSIBLE HITTING REGION $x < 0$ | LIABLE TO FLY LEFT MOVE TO FIELD SCREEN |
| POSSIBLE HITTING REGION $y > 0$ | LIABLE TO BE FLY BALL MOVE TO FIELD SCREEN |
| POSSIBLE HITTING REGION $y < 0$ | LIABLE TO BE GROUNDER MOVE TO FIELD SCREEN |
| OUTSIDE POSSIBLE HITTING REGION | AIR SHOT MOVE TO PITCHED BALL JUDGEMENT |

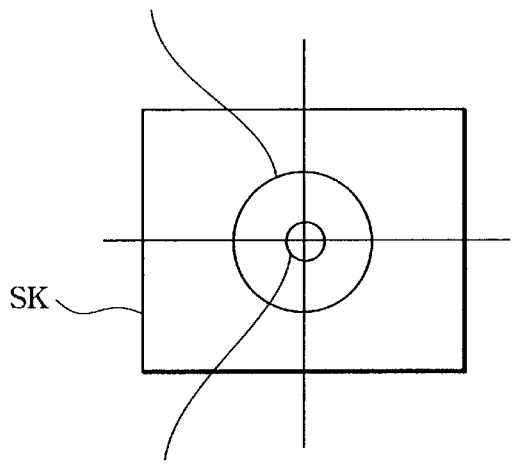

HOMING REGION: RHG

SK

CIRCLE THROUGH WHICH BAT PASSES : SP

FIG.29

| DIFFICULTY LEVEL AND COEFFICIENT | | RATIO OF STRIKE ZONE OCCUPIED BY HOMING REGION |
|---|---|---|
| DIFFICULTY LEVEL 1 | (a=) 1 | 1/4 OF STRIKE ZONE WHEN SKILLED HITTING ABILITY = 10 |
| DIFFICULTY LEVEL 2 | 0.45 | 1/4 OF STRIKE ZONE WHEN SKILLED HITTING ABILITY = 25 |
| DIFFICULTY LEVEL 3 | 0.25 | 1/4 OF STRIKE ZONE WHEN SKILLED HITTING ABILITY = 50 |
| DIFFICULTY LEVEL 4 | 0.15 | 1/4 OF STRIKE ZONE WHEN SKILLED HITTING ABILITY = 76 |
| DIFFICULTY LEVEL 5 | 0.1 | 1/4 OF STRIKE ZONE WHEN SKILLED HITTING ABILITY = 100 |
| DIFFICULTY LEVEL 6 | 0.09 | 9/10 OF DEFAULT WHEN SKILLED HITTING ABILITY = 100 |
| DIFFICULTY LEVEL 7 | 0.07 | 7/10 OF DEFAULT WHEN SKILLED HITTING ABILITY = 100 |
| DIFFICULTY LEVEL 8 | 0.05 | 5/10 OF DEFAULT WHEN SKILLED HITTING ABILITY = 100 |
| DIFFICULTY LEVEL 9 | 0.03 | 3/10 OF DEFAULT WHEN SKILLED HITTING ABILITY = 100 |
| DIFFICULTY LEVEL 10 | 0 | NO HOMING, EVEN WHEN SKILLED HITTING ABILITY = 100 |

HOMING REGION REDUCES WHEN LEVEL OF DIFFICULY INCREASES

GAME DEVICE, COLLISION DETERMINATION METHOD AND INFORMATION STORING MEDIUM

BACKGROUND OF THE INVENTION

1. Field of the Invention

The present invention relates to a video game device, and more particularly, to improvements in simulation of players' movements, and the like, in a game device for a baseball game, or the like.

2. Description of the Related Art

In a so-called baseball game device, a baseball game is played between a pitching (defense) side and a batting (offense) side, in a competitive format between two users or a competitive format between one user and the computer. In this case, generally, the outcome of the game is determined by the users' respective skill levels.

However, in actual baseball, in addition to the abilities and characteristics of each individual user, the game also develops according to the combined competitive ability of the teams involved, which makes the game more interesting. Therefore, attempts have been made to develop a baseball game wherein data for a baseball player is assigned to each player character in a baseball game, and the user controls the game by taking into account the individual characteristics of each player character. Therefore, it has been sought to achieve a simulation which reflects the individual characteristics of the respective players.

SUMMARY OF THE INVENTION

Consequently, an object of the present invention to make a hit against a thrown ball or moving object correspond to the individual characteristics of a batting player, or the like, in such a manner that it imitates the sensation of a hit in a real baseball match.

Moreover, it is another object of the present invention to make a hit against a thrown ball or moving object correspond to the hitting ability of the batting player and the level of difficulty of the game, in such a manner that it imitates the sensation of batting in a real baseball match.

In order to achieve one object described above, the present invention is a game device for simulating baseball, whereby a batter hits a ball pitched by a pitcher, with a bat, these actions being displayed on a screen, comprising: storage means for storing data relating to good hitting courses and bad hitting courses for each batter; pitch calculating means for calculating the path of a ball pitched by the pitcher; hit position specifying means for specifying the hit position of the batter; swing start instructing means for instructing a swing of the bat; judging means for judging the degree of suitability of the hitting course set by the hitter at the specified hitting position, on the basis of the data; impact judgement region determining means for defining an impact judgement region in accordance with the degree of suitability of the hitting course at the hitting position; and impact judging means for judging the impact between the ball and the bat on the basis of the path of the ball, the hitting position, the impact region and the timing of the swing.

By means of this composition, the suitability of the hitting course for the batter can be reflected in the result of the hit.

Desirably, the impact judgement region determining means determines the size of the impact judgement region in accordance with the degree of suitability of the hitting course.

Desirably, the impact judgement region comprises a central stable hit region and a possible hit region formed surrounding same, and the impact judgement region determining means determines the width of the stable hit region according to the degree of suitability of the hitting course.

Desirably, the storage means expresses the region of a good or bad hitting course relating to a batter as an approximately square-shaped region, and this approximately square-shaped region is represented by positional data for two mutually opposing vertices thereof.

Desirably, the storage means expresses the region of a good or bad hitting course relating to the batter as an approximate polygonal region or an approximately circular shape.

Desirably, the storage means expands or contracts the outer edges of the region of a good or bad hitting course, according to the hitting performance of the batter.

The impact judgement method for a baseball game device according to the present invention is an impact judgement method for a game device for simulating baseball, whereby a batter hits a ball pitched by a pitcher, with a bat, these actions being displayed on a screen, comprising the steps of: calculating the path of a ball pitched by the pitcher; specifying the hit position of the batter; instructing a swing of the bat; judging the degree of suitability of the hitting course set by the hitter at the specified hitting position, on the basis of previously stored data for the batter; defining the size of an impact judgement region in accordance with the degree of suitability of the hitting course at the hitting position; and judging the impact between the ball and the bat on the basis of the path of the ball, the hitting position, the impact region and the timing of the swing.

Moreover, the impact judgement method for a game device according to the present invention is an impact judgement method for a game device for simulating a game whereby a second player hits a moving object launched by a first player, with a hitting implement, these actions being displayed on a screen, comprising the steps of: calculating the path of the moving object launched by the first player; specifying the hitting position of the second player; instructing the start of a swing of the hitting object; determining the degree of suitability of the hitting course set by the second player at the specified hitting position, on the basis of data relating to the second player; determining the size of an impact judgement region according to the degree of suitability of the hitting course at the hitting position; and judging the impact between the moving object and the hitting implement, on the basis of the path of the moving object, the hitting position, the impact region, and the timing of the swing.

Desirably, the hitting implement is any one of, at the least, a bat, a racket, a club, a board, a pole, or the second player's foot, head, or arm.

The information storage medium relating to the present invention stores a program for causing a computer system to operate as a baseball game device as described above.

Moreover, the information storage medium relating to the present invention stores a program for causing a computer system to execute an impact judgement method in a baseball game as described above.

On the other hand, in order to achieve the other object described above, the game device according to the present invention is a game device for executing a game, whereby an operational object which behaves in accordance with the operation of a second subject collides with a moving object caused to move by the operation of a first subject, in a virtual three-dimensional space, wherein at least one of either the operational ability of the second subject and/or the difficulty level of the game is reflected in the game by means of the behaviour of the operational object.

It may, for example, comprise homing means for homing the operational object towards the moving object, on the basis of a homing region which reflects at least one of either the operational ability of the second subject and/or the difficulty level of the game.

Desirably, the homing means comprises: target setting means for setting a target point indicating the goal of the operational object; region setting means for setting the homing region in accordance with the target point set by the target setting means; and executing means for executing the homing on the basis of the homing region set by the region setting means. For example, the target setting means may comprise indicating means for indicating the target point according to operations implemented by a player.

Moreover, desirably, the target setting means represents the target point as a size which reflects the size of a portion of the operational object.

Furthermore, the region setting means may set a circular homing region having a variable radius centred on the target point. In this case, for example, the region setting means may determine the radius by calculating a figure representing the operational ability of the second subject and the level of difficulty of the game, by means of a prescribed formula.

This formula may, for example, comprise an element for multiplying together figures respectively representing the operational ability of the second subject and the level of difficulty of the game, the figure representing the operational ability being a figure which increases from 0 to a prescribed value with respect to increase in the operational ability, and the figure representing the difficulty level being a coefficient which decreases from 1 to 0 inversely with respect to increase in the difficulty level.

Desirably, the region setting means comprises adjusting means for adjusting the size of the homing region by also taking account of the degree of suitability of the operation of the second object with respect to the course of movement of the moving object.

Moreover, desirably, the executing means comprises control means for matching the target point with the moving object, when the end position of the moving object lies within the homing region, at a prescribed position in the operating region of the operational object.

The executing means may, for example, comprise: means for detecting the direction in which a player is operating the indicating means; and means for determining whether this operational direction is the same as the movement direction of the moving object; the control means changing the state of control implemented for matching the target point with the moving object, according to the state determined by the determining means.

In a suitable example, the game is a baseball game executed in a virtual three-dimensional space, the first subject is a pitcher character, the moving object is a ball thrown by the pitcher character, the second subject is a batter character operated in response to controls implemented by a player, and the operational object is a bat which is swung by the batter character. The operational ability of the second subject may be, for example, the skilled hitting ability assigned to the batter character.

The information storage medium relating to a further aspect of the present invention stores a program for causing a computer system to operate as a game device for achieving the second object.

BRIEF DESCRIPTION OF THE DRAWINGS

FIG. 19 is a diagram illustrating the direction of flight of a hit ball according to the hitting position within a hitting area;

FIG. 20 is a diagram showing ball flight directions and movement screens according to the hitting position within a hitting area;

FIG. 28 is a diagram for explaining homing;

FIG. 29 is a diagram for explaining homing;

DESCRIPTION OF THE PREFERRED EMBODIMENTS

Below, embodiments of the present invention are described with reference to the drawings.

First embodiment

A first embodiment of the present invention is described with reference to FIGS. 1–22.

Figure 1:
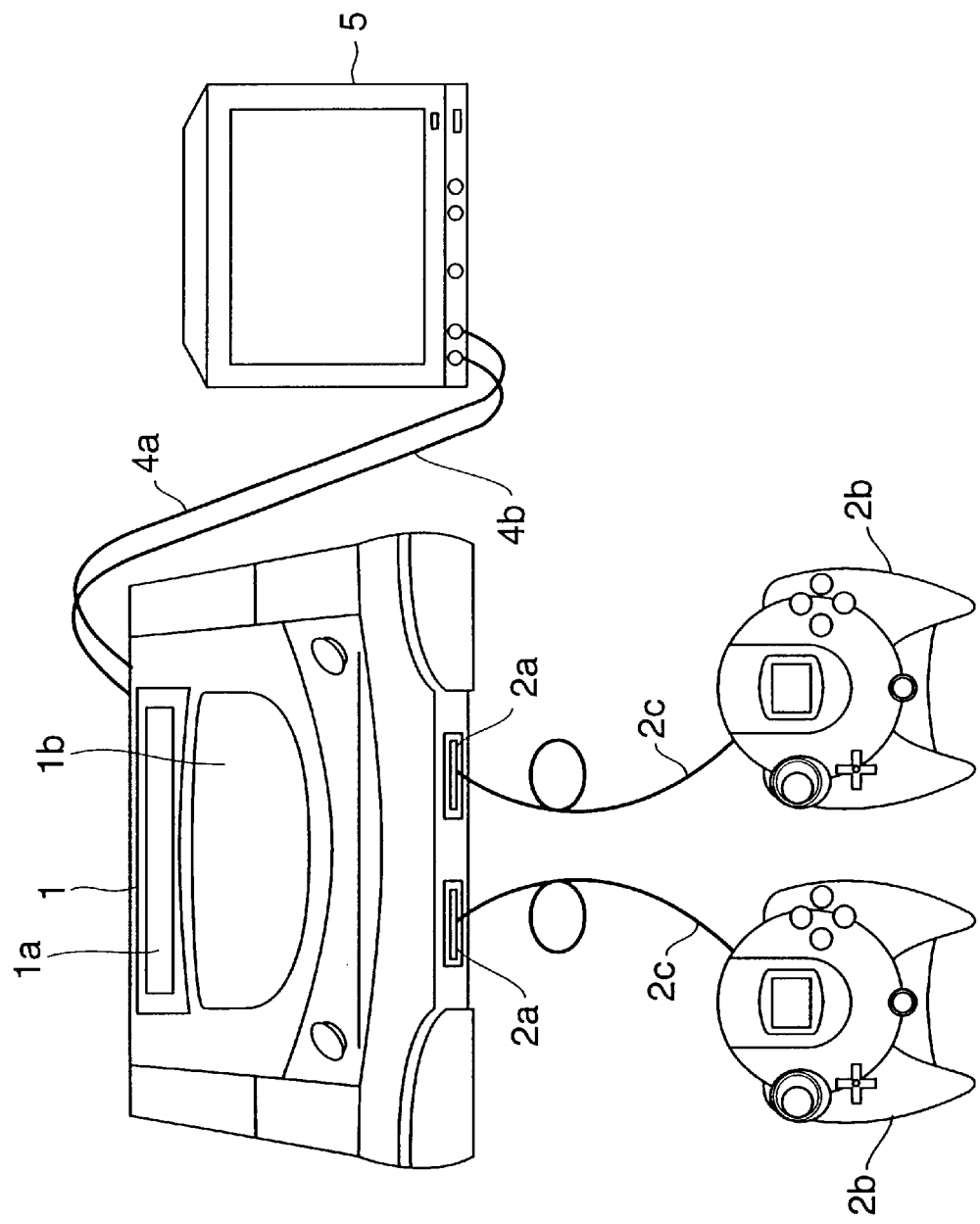
FIG. 1 is a diagram showing an overview of a game device according to the first embodiment.

FIG. 1 is an external view of a video game device using an image processing device relating to a first embodiment. In this diagram, a video game main unit 1 is approximately box-shaped, and is provided with internal circuit boards, and the like, for performing game processing. Moreover, two connectors 2*a* are provided on the front face of the video game main unit 1, and game pads 2*b* for controlling the game are connected via cables 2*c* to these connectors 2*a*. Two game pads 2*b* are used when two players are playing the game.

A cartridge I/F 1*a* for connecting ROM cartridges and a CD-ROM drive 1*b* for reading CD-ROMs are provided on the upper portion of the video game main unit 1. Although not shown in the diagram, a video output terminal and audio output terminal are provided on the rear face of the video game main unit 1. The video output terminal is connected via a cable 4*a* to a video input terminal of a video monitor 5, whilst the audio output terminal is connected via a cable 4*b* to the audio input terminal of the video monitor 5. In a video game device of this kind, a user can play a game by controlling a game pad 2*b* whilst watching images displayed on the video monitor 5.

Figure 2:
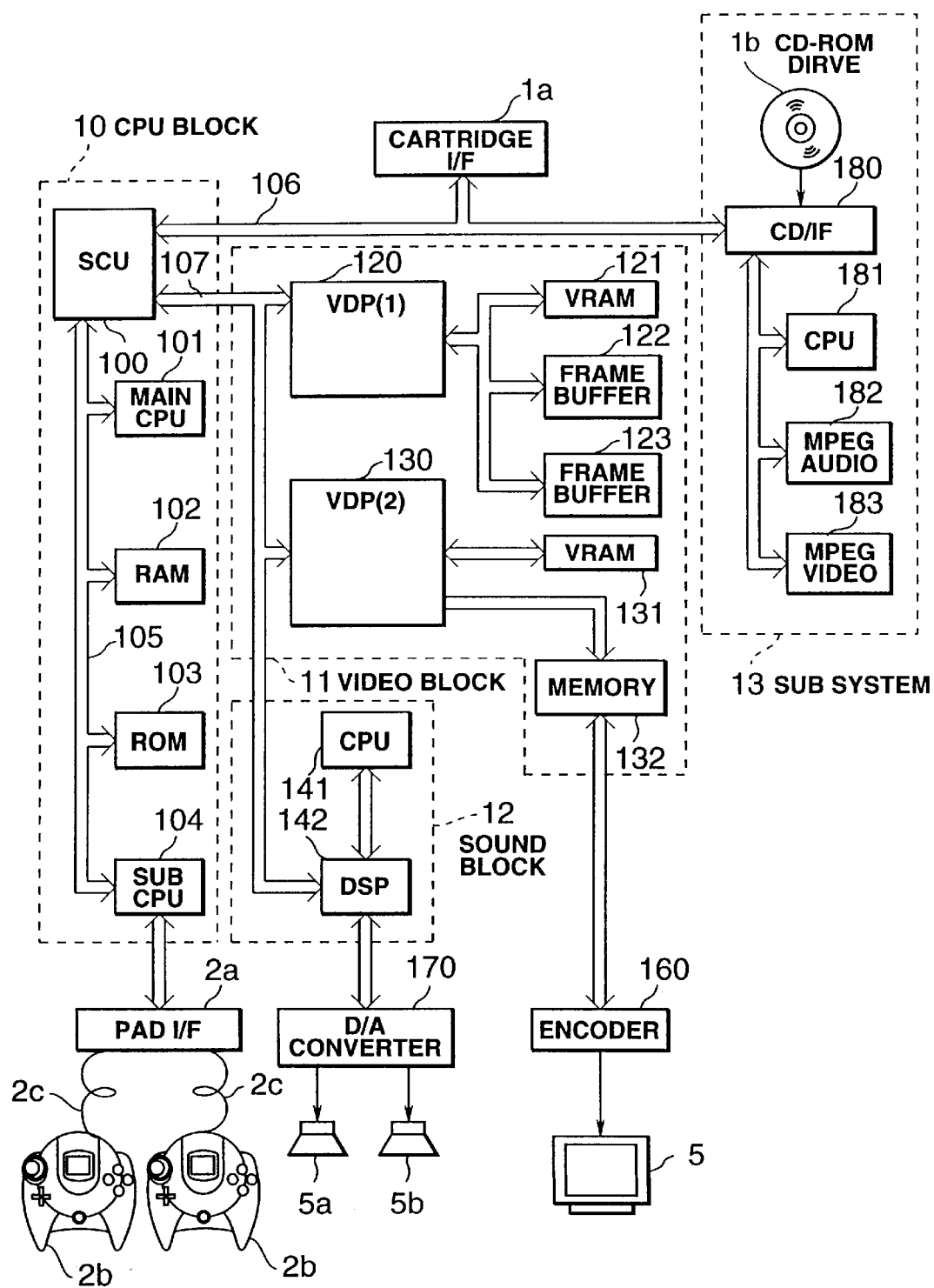
FIG. 2 is a block diagram showing a control system for a game device according to the first embodiment.

FIG. 2 is a block diagram giving a general view of a video game device relating to the present embodiment. This image processing device comprises a CPU block 10 for controlling the whole device, a video block 11 for controlling display of game images, a sound block 12 for generating sound effects, and the like, and a subsystem 13 for reading from a CD-ROM.

The CPU block 10 comprises an SCU (System Control Unit) 100, main CPU 101, RAM 102, ROM 103, cartridge I/F 1*a*, sub-CPU 104, CPU bus 103, and the like. The main CPU 101 controls the whole device. This main CPU 101 comprises an internal calculating function similar to a DSP (Digital Signal Processor), and is capable of executing applicational software at high speed. The RAM 102 is used as a work area for the main CPU 101. The ROM 103 contains initial programs, and the like, for initialization processing. The SCU 100 conducts smooth data input and output between the main CPU 101, VDPs 120, 130, DSP 140, CPU 141, and the like, by controlling buses 105, 106, 107.

Furthermore, the SCU 100 is provided with an internal DMA controller, which is capable of transferring sprite data for the game to a VRAM in the video block 11. Thereby, it is capable of executing applicational software for a game, or the like, at high speed. The cartridge I/F 1*a* is used to input applicational software supplied in the form of a ROM cartridge. The sub CPU 104 is known as an SMPC (System Manager & Peripheral Control), and comprises a function for gathering peripheral data from the game pads 2*b* via the connectors 2*a*, in accordance with requests from the main CPU 101. The main CPU 101 conducts processing on the basis of the peripheral data received from the sub-CPU 104. Any type of peripheral device such as a game pad, joystick, keyboard, or the like, can be connected to the connectors 2*a*. The sub CPU 104 automatically identifies the type of peripheral device connected to a connector 2*a* (terminal on main unit side), and is provided with a function for gathering peripheral data, or the like, according to a communications format which corresponds to the type of peripheral device.

The video block 11 comprises a VDP (Video Display Processor) 120 for drawing characters, such as pitchers, batters, and fielders, for example, constituted by polygon data for a video game, and a VDP 130 for drawing background images, synthesizing polygon image data and background images, and carrying out clipping processing, and the like. The VDP 120 is connected to a VRAM 121 and a frame buffer 122, 123. Polygon image data representing characters in a video game device is transferred from the main CPU 101, via the SCU 100, to the VDP 120, where it is written to the VRAM 121. The image data written to the VRAM 121 is then, for example, drawn to a drawing frame buffer 122 or 123 in a 16 or 8-bit/pixel format. The data drawn to the frame buffers 122 or 123 is transferred to the VDP 130. Information for controlling the drawing process is supplied from the main CPU 101 via the SCU 100 to the VDP 120. The VDP 120 then carries out drawing processes in accordance with these instructions.

The VDP 130 is connected to a VRAM 131, and is constituted in such a manner that image data output from the VDP 130 is supplied via a memory 132 to an encoder 160. The encoder 160 generates an image signal by appending a synchronizing signal, and the like, to this image data, whereupon the image signal is output to the video monitor 5. Thereby, a game screen is displayed on the video monitor 5.

The sound block 12 comprises a DSP 140 for synthesizing sounds according to a PCM format or FM format and a CPU 141 for controlling this DSP 140, and the like. Sound data generated by the DSP 140 is converted to a two-channel signal by a D/A converter 170 and then output to a speaker 5*b*.

The subsystem 13 comprises a CD-ROM drive 1*b*, CD I/F 180, CPU 181, MPEG AUDIO 182, MPEG VIDEO 183, and the like. This subsystem 13 has the functions of reading in applicational software supplied in CD-ROM format and regenerating animated images, and the like. The CD-ROM drive 1*b* reads in data from the CD-ROM and the CPU 181 controls the CD-ROM drive 1*b* and carries out processing, such as error correction, or the like, on the data read out. The data read from the CD-ROM is supplied via CD I/F 180, bus 106 and SCU 100 to the main CPU 101, where it is used as applicational software. Furthermore, the MPEG AUDIO 182 and MPEG VIDEO 183 are devices for restoring data compressed according to MPEG (Motion Picture Expert Group) standards. Animated pictures can be regenerated by restoring the MPEG-compressed data written on the CD-ROM, by means of the MPEG AUDIO 182 and MPEG VIDEO 183.

Figure 3:
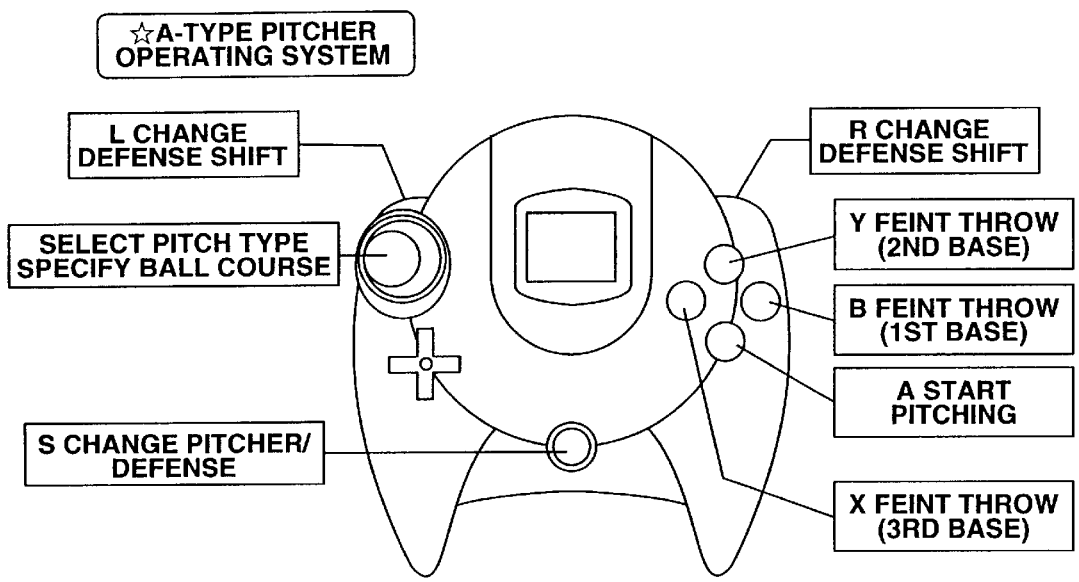
FIG. 3 is a diagram illustrating an example of the allocation of commands to the keys of a game pad on the pitching side.
Figure 4:
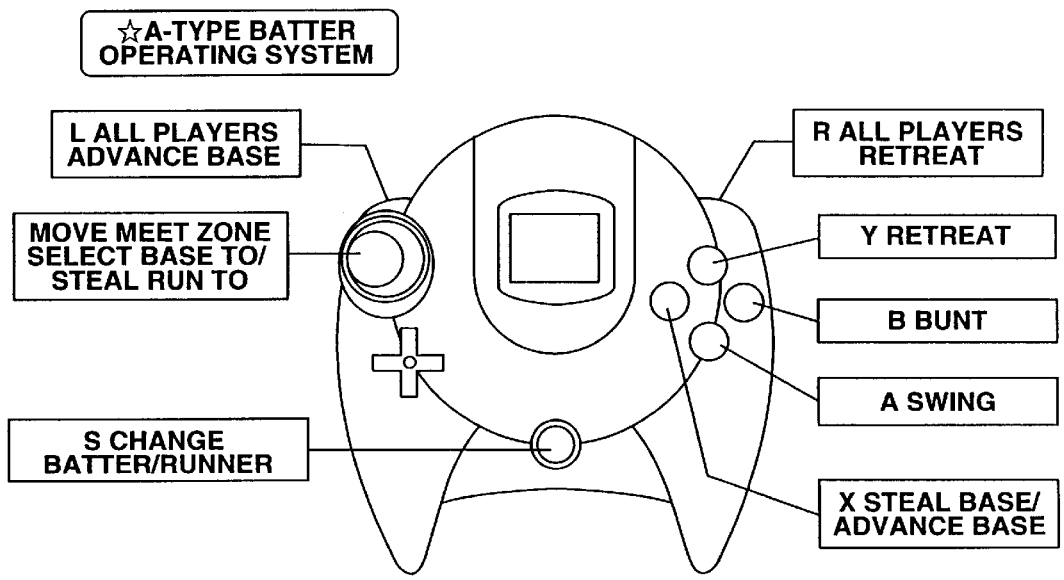
FIG. 4 is a diagram illustrating an example of the allocation of commands to the keys of a game pad on the batting side.

FIG. 3 and FIG. 4 show an example of a game pad. The game pad is provided with an L button, R button, A button, B button, X button, Y button, S button, cross key, analogue cross key, LCD display section, and the like. The analogue cross key is used to generate directional information throughout a 360° range.

When the game player is playing as a pitcher, the aforementioned buttons may generate the following commands which are supplied to the game device. For example, L button: defense shift to the left; R button: a defense shift to the right; A button: start pitch; B button: a feint throw to first base; X button: a feint throw to third base; Y button: a feint throw to second base; S button: change pitcher/defense; analogue cross key: select type of pitch, determine flight of ball. In this case, the cross key does not have a defined function.

If the player is a batter, then the aforementioned buttons may generate the following commands. For example, L button: all players advance one base; R button: all players retreat one base; A button: swing; B button: bunt; X button: double steal base/advance base; Y button: retreat; S button: change batter/runner; analogue cross key: move meet zone, steal base/advance one base. The cross key is not used in this case.

Figure 5:
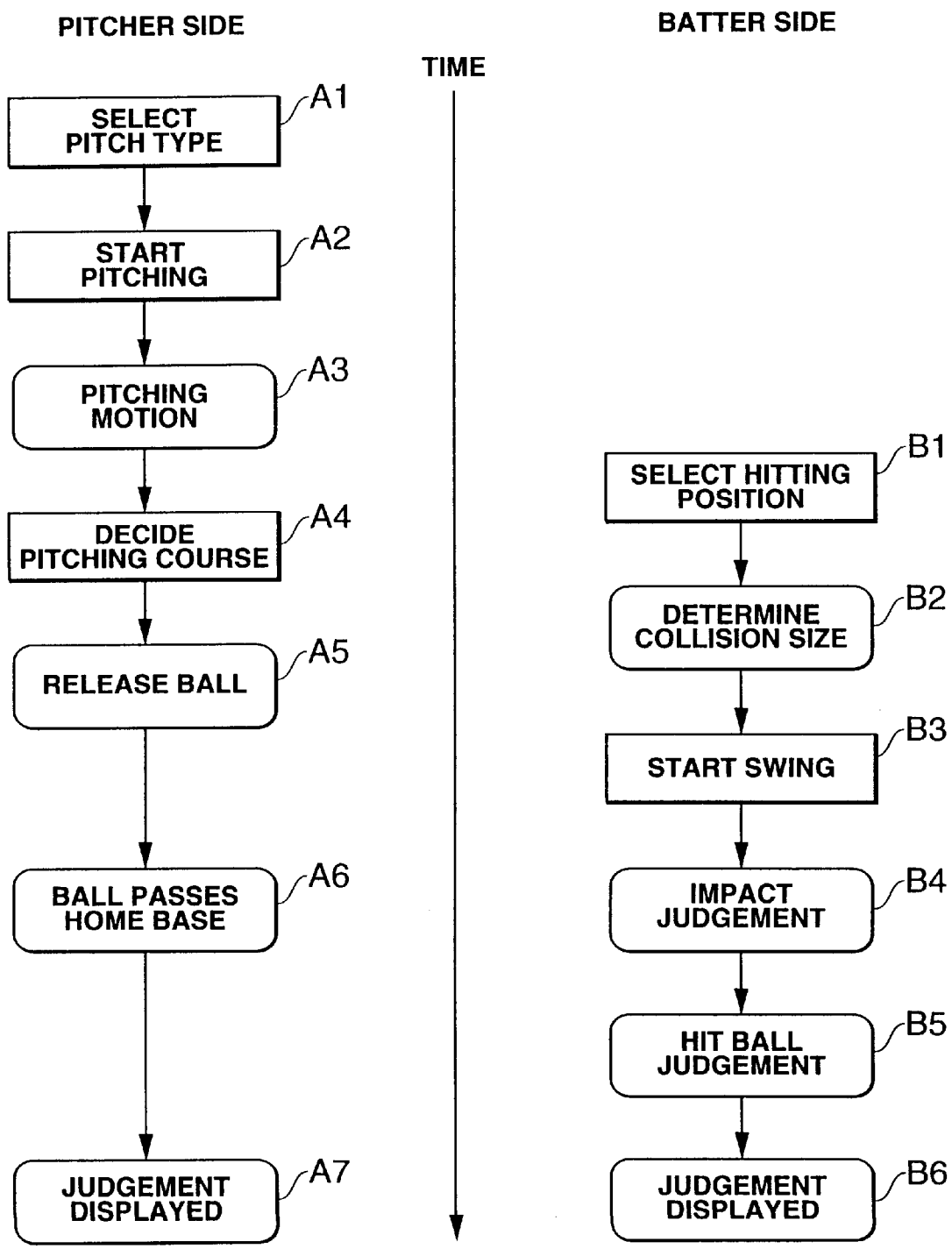
FIG. 5 is a diagram showing a sequence for pitching and batting.

The outline of pitching and batting operations in a baseball game is now described with reference to the drawings. FIG. 5 illustrates the sequence of a pitching operation in a baseball game. In this diagram, the central axis represents the direction of the progress of the game (time axis). The region on the left-hand side of the diagram represents the operations of the pitcher and the region of the right-hand side of the diagram represents the operations of the batter.

Figure 6:
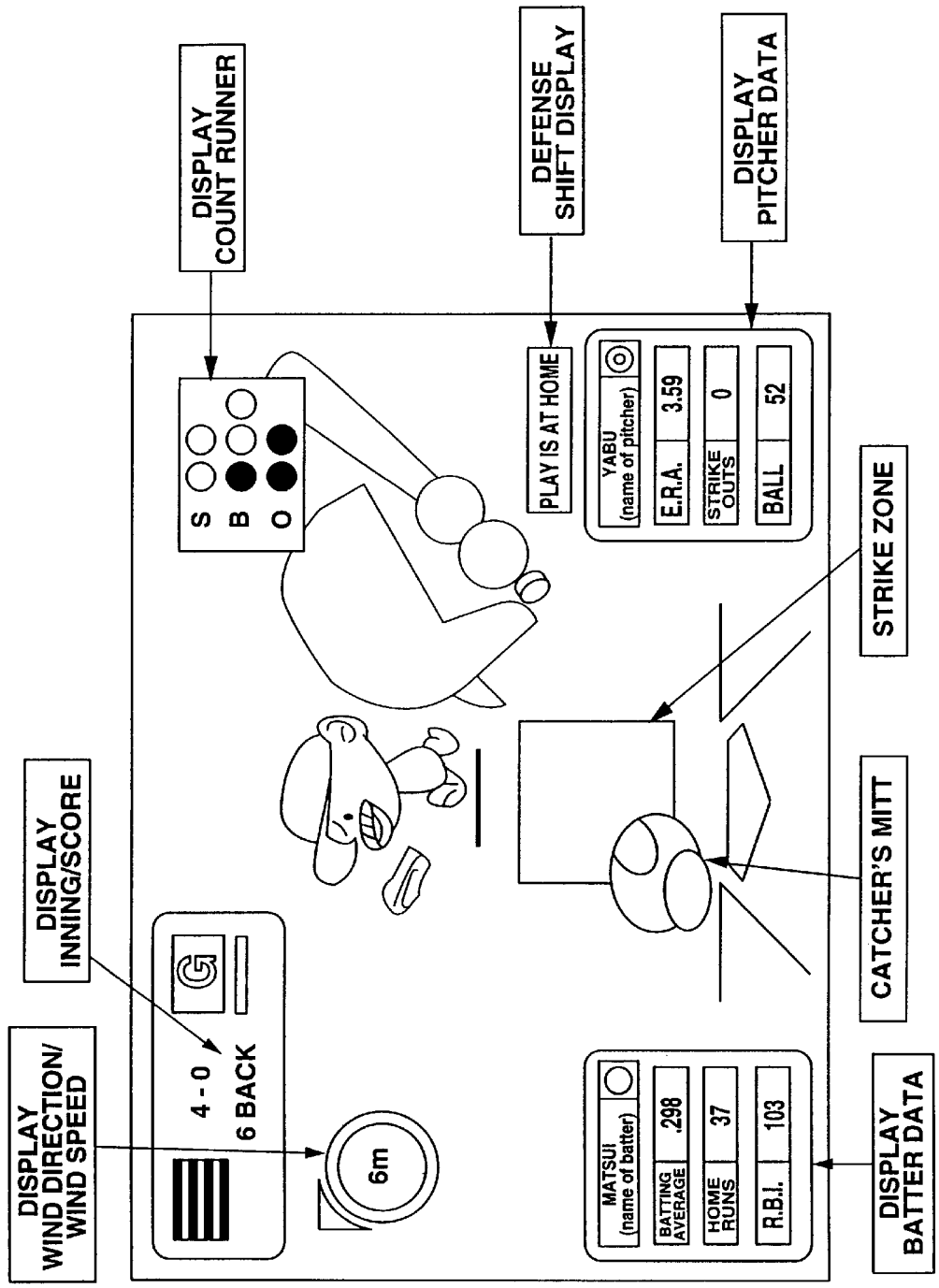
FIG. 6 is a diagram showing an example of a screen in a baseball game.

One example of a pitching screen is shown in FIG. 6. A pitcher object is located slightly above the centre of the screen in this diagram, and the pitching operation is performed according to the instructions input by player A. A batter object is located to the right-hand side of the screen and a hitting operation is performed according to the instructions input by player B. An innings and score display object is displayed on the left-hand side of the screen, and this shows the current innings, the attacking team, and the points scores. A count and runner display object is located at the top right of the screen, and this displays the current state of the count and runners. A wind direction and wind speed object is located below the innings and score display object, and this displays the current wind direction and wind speed. At the centre bottom of the screen, there is a home base object, and a batter box object is positioned on either side of this home base object.

A strike zone object indicating the strike zone is located above the home base object and a catcher mitt object is superimposed over this strike zone object. The catcher mitt object indicates the path of the pitch, and it is displayed before the ball is released by the pitcher, but is not displayed after the ball has been released. Moreover, it is displayed again when a 'ball' is declared. On the bottom right of the screen, there is a pitcher data object representing the pitcher's name, defensive rate, strikeouts, number of pitches, and the like. A defense shift object providing a defense shift display of a level (not shown), bunt shift, play is at home, long hit warning, and the like, is located on top of the pitcher data object. On the bottom left of the screen, there is a batter data display object showing the hit rate, number of home runs, and score.

Figure 7:
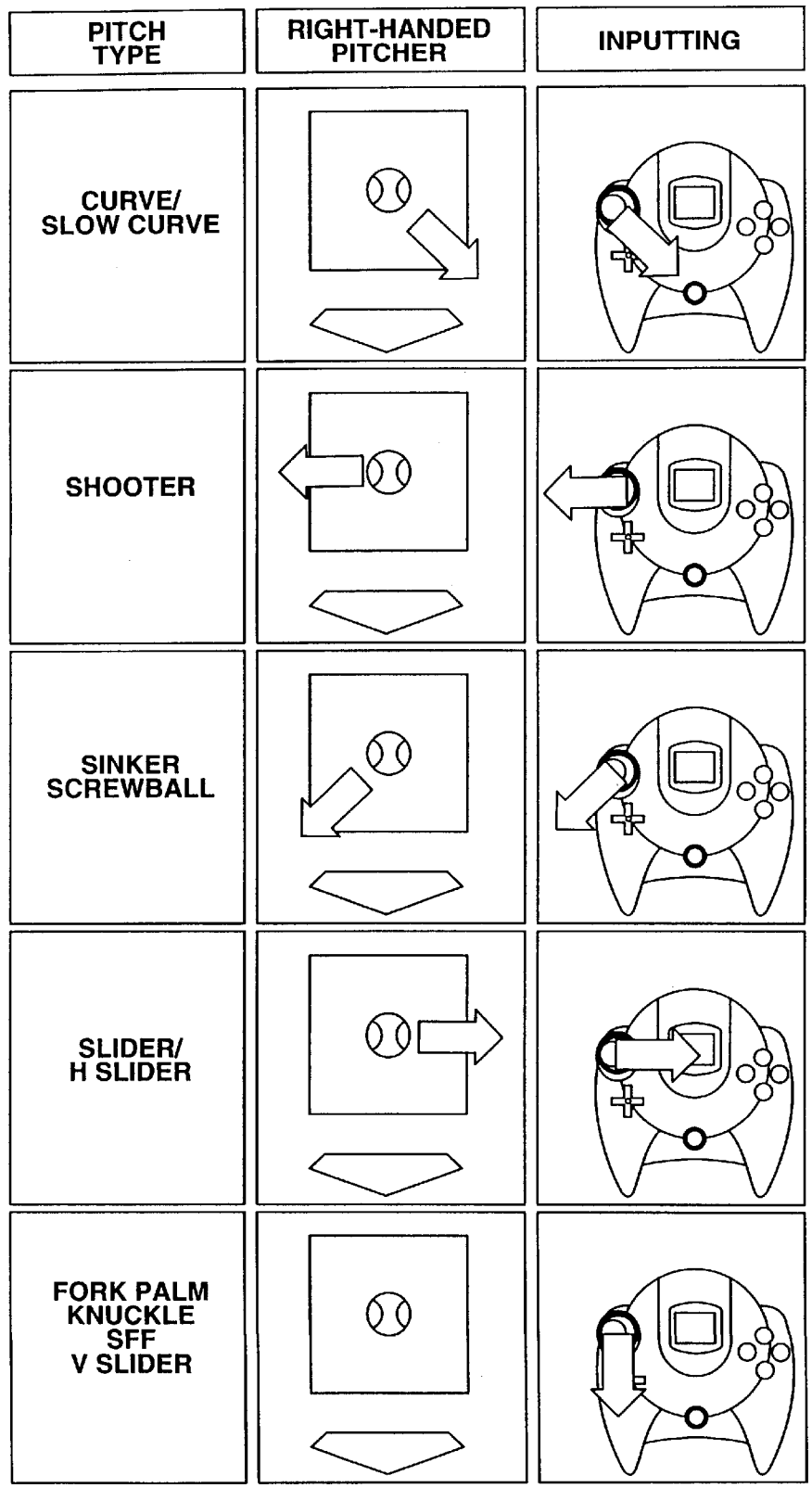
FIG. 7 is a diagram showing pitch types and input examples for pitch types.

Firstly, player A on the pitching side selects a type of pitch, using the analogue cross key on the game pad (A1). As illustrated in FIG. 7, the type of pitch is selected by means of the player operating the analogue cross key in one of the ball change directions. For example, if a right-handed pitcher wants to throw a curve ball, then the player presses the analogue cross key in the right downward direction, in other words, in a direction of approximately 135°, taking the vertical direction as 0°. FIG. 7 shows an example of a right-handed pitcher. In the case of a left-handed pitcher, the relationship between the types of pitch and the key operation directions is laterally symmetrical to the relationship shown in the diagram, but it is similar with regard to the operation of the analogue cross key in the ball change directions. Also, when moving a cursor or inputting the type of pitch, the analogue cross key can be used to specify an area in one of eight separate directions, namely up, down, left, right, up and right, down and right, up and left, down and left.

Figure 8:
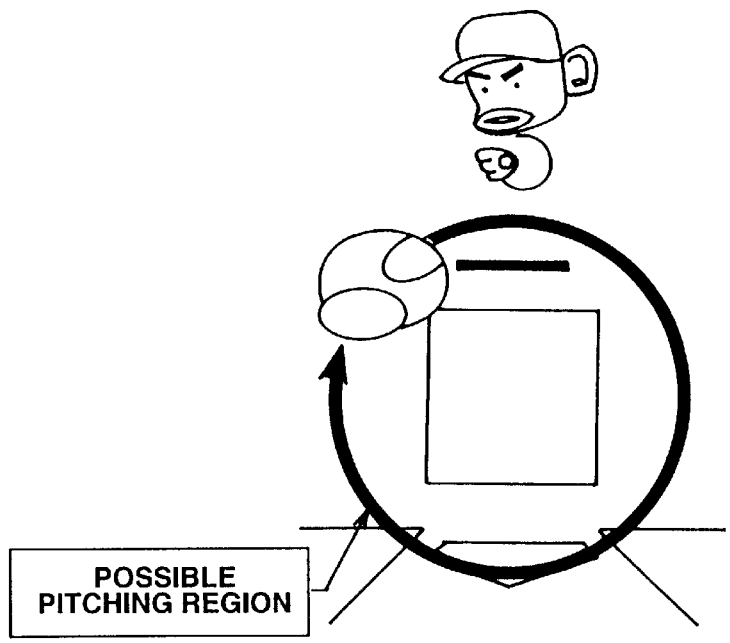
FIG. 8 is a diagram showing an example of setting the position of a pitched ball.

After selecting the type of pitch, when player A presses button A on his or her game pad, the pitcher object starts a prescribed series of pitching operations (A2). During this pitching motion (A3), player A determines the course of the ball by operating the analogue cross key (A4). As illustrated in FIG. 8, the course of the ball is determined by means of the player on the pitching side operating the analogue cross key. The course of the ball can also be determined by analogue co-ordinates within a set pitching range.

When the pitcher releases the ball, the CPU calculates the path of the ball in accordance with the specified type of pitch and course of the ball. A simulation depicting the ball following the calculated path is performed (A5).

Figure 9:
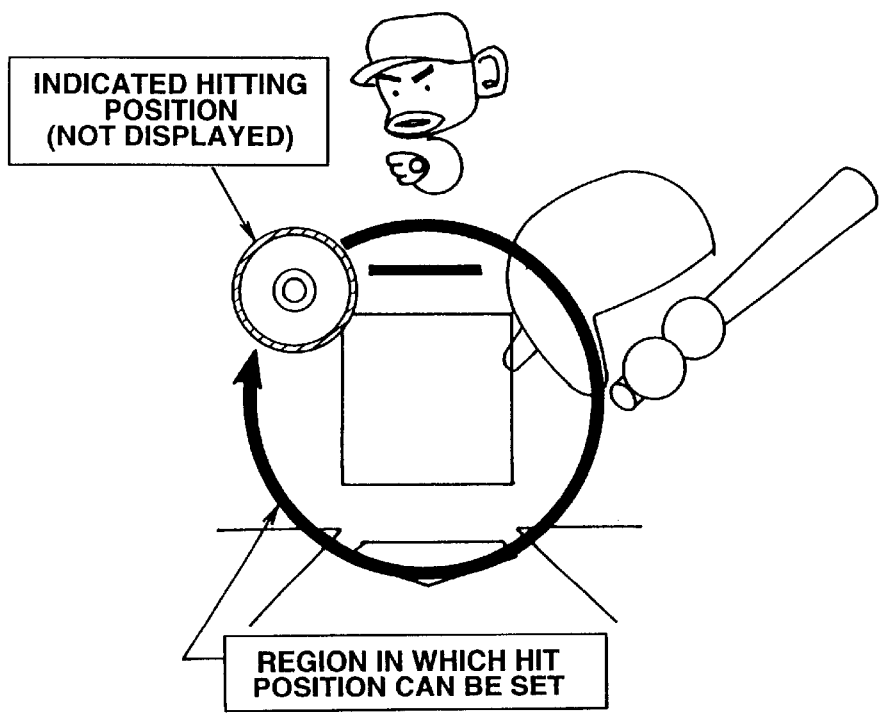
FIG. 9 is a diagram showing an example of specifying a hitting position.

Player B on the batting side, specifies his or her batting position (B1) by using the analogue cross key, as illustrated in FIG. 9. The batter can move the indicated hitting position freely by operating the analogue cross key, and when the analogue cross key is in a neutral position, the hit position returns to the centre of the strike zone. The indicated hitting position is only displayed when the type of pitch is being decided. The hit position can be specified within a set hitting range. The size of a collision object for determining the impact between the bat and the ball according to the hitting position, and determining an impact region, is then decided. The determined size of the collision object reflects the degree of suitability of the hitting course (or hitting region) for that batter (B2). Here, the hitting course describes whether the hit made by the player's swing of the bat is good or bad for that batter, and it may comprise a two-dimensional hitting region or a three-dimensional hitting region.

Figure 10:
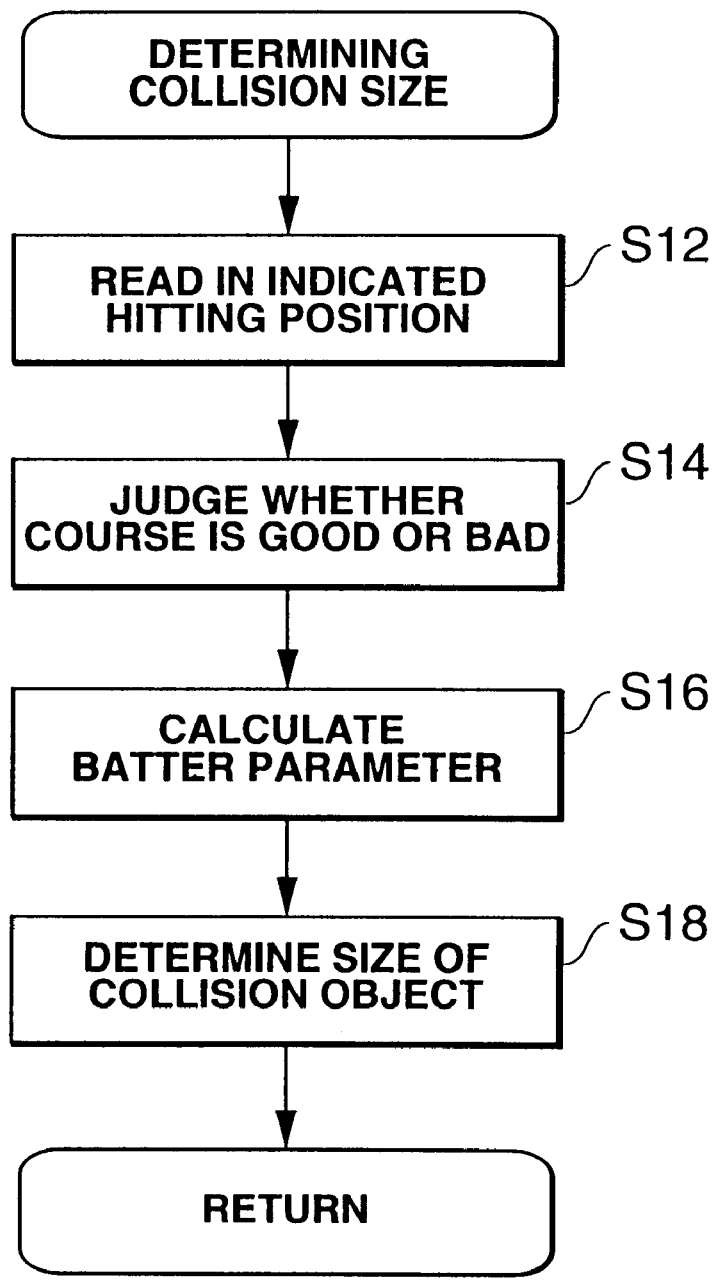
FIG. 10 is a flowchart illustrating an example of determining the size of the collision object used in impact judgement processing.

FIG. 10 is a flowchart describing a procedure for determining the size of the collision object.

Firstly, the indicated hitting position specified by the player is read in (S12, FIG. 9). Thereupon, basic data for the batter (player character) recorded previously in a database, as described later, is read in and it is determined whether or not the hit position specified by player B lies on a poor course, a normal course, or a good course, for the player character in question (S14). A batter parameter is set by applying a course-specific weighting to the hit characteristics, depending on whether the course is poor, normal or good. The size of the impact between bat and ball is varied according to the hitting course, in order to imitate the characteristics of a real baseball player (S16). The size of the collision object is determined on the basis of the batter parameter, which reflects the suitability of the set hitting course (S16). As described later, it is also possible to make the hitting course have an effect on other batter parameters, such as long hitting ability, skilled hitting ability, and the like. The size of the collision object is also determined according to the long hitting ability and skilled hitting ability parameters. Moreover, the long hitting ability may also be affected by variable parameters in the game and hard pitch parameters. Furthermore, skilled hitting ability may be affected by pitch compatibility parameters. Moreover, it is also possible to alter the size of the collision object according to the course-specific hit characteristics only, thereby changing the amount of variation in the impact depending on the hitting course. In this way, the size of the collision object is determined according to the hitting course.

Thereupon, player B operates button A on his or her game pad at an appropriate timing, thereby initiating the batter's swing (B3).

When the pitched ball passes over home base, the position of the pitched ball and the strike zone are displayed simultaneously on the screen. It is judged whether the pitched ball is a 'ball' or 'strike' (S6). The result of this judgement process is displayed on the screen as text reading 'STRIKE' or 'BALL' (A7).

Moreover, when the pitched ball passes over home base, impact judgement processing is carried out on the basis of the path of travel of the pitched ball, the position of the collision object corresponding to the indicated hitting position, and the timing of the swing (B4).

If the ball is judged to hit the bat, then the direction in which the ball flies is determined (B5), and the display moves to a fielding screen wherein the viewpoint is switched to that of a fielder.

Figure 11:
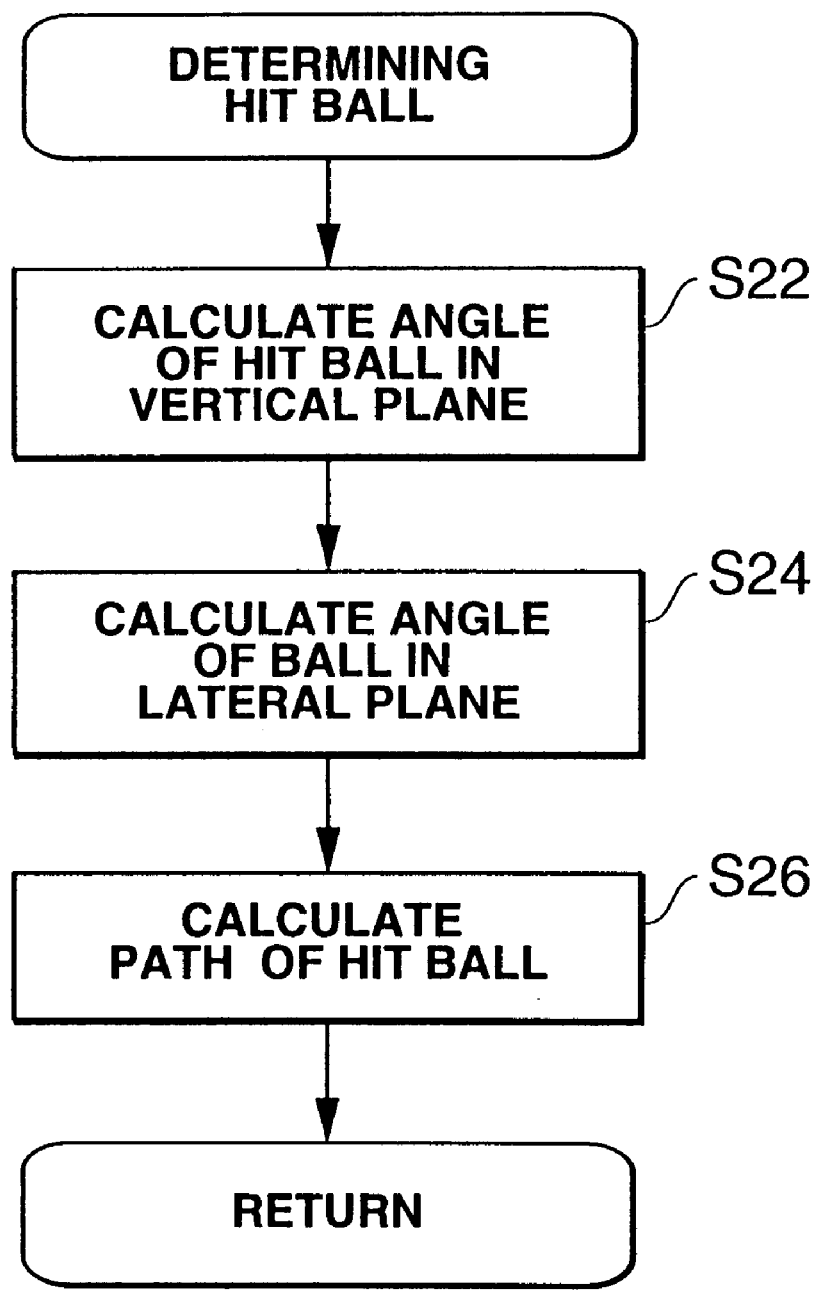
FIG. 11 is a flowchart illustrating processing for judging the direction of the flight of a hit ball.

FIG. 11 is a flowchart describing a routine for judging the flight direction of the ball.

Firstly, as described later with reference to FIG. 18, the flight direction of the ball in the vertical plane is determined according to the vertical position of the ball from the centre of the perpendicular face of the collision object when it strikes the bat (S22). Thereupon, the flight direction of the ball in the lateral (left/right) plane is determined according to whether the swing timing is "early" or "late" (S24). The path of travel of the ball, its landing point, and so on, are calculated from the hitting position, angle of flight of the ball in the vertical and lateral directions, and the like (S26). The calculated data is stored as a ball parameter in a prescribed memory location, and the device then returns to the main routine.

On the other hand, if it is judged that the ball does not hit the bat and the batter swings at air, then the swing position and the strike zone are displayed simultaneously on the screen.

The swing position and the strike zone are also displayed during 'ball' and 'strike' judgement processing (B6). In this way, pitching and hitting operations, impact judgement processing and image formation processing are carried out.

Figure 12:
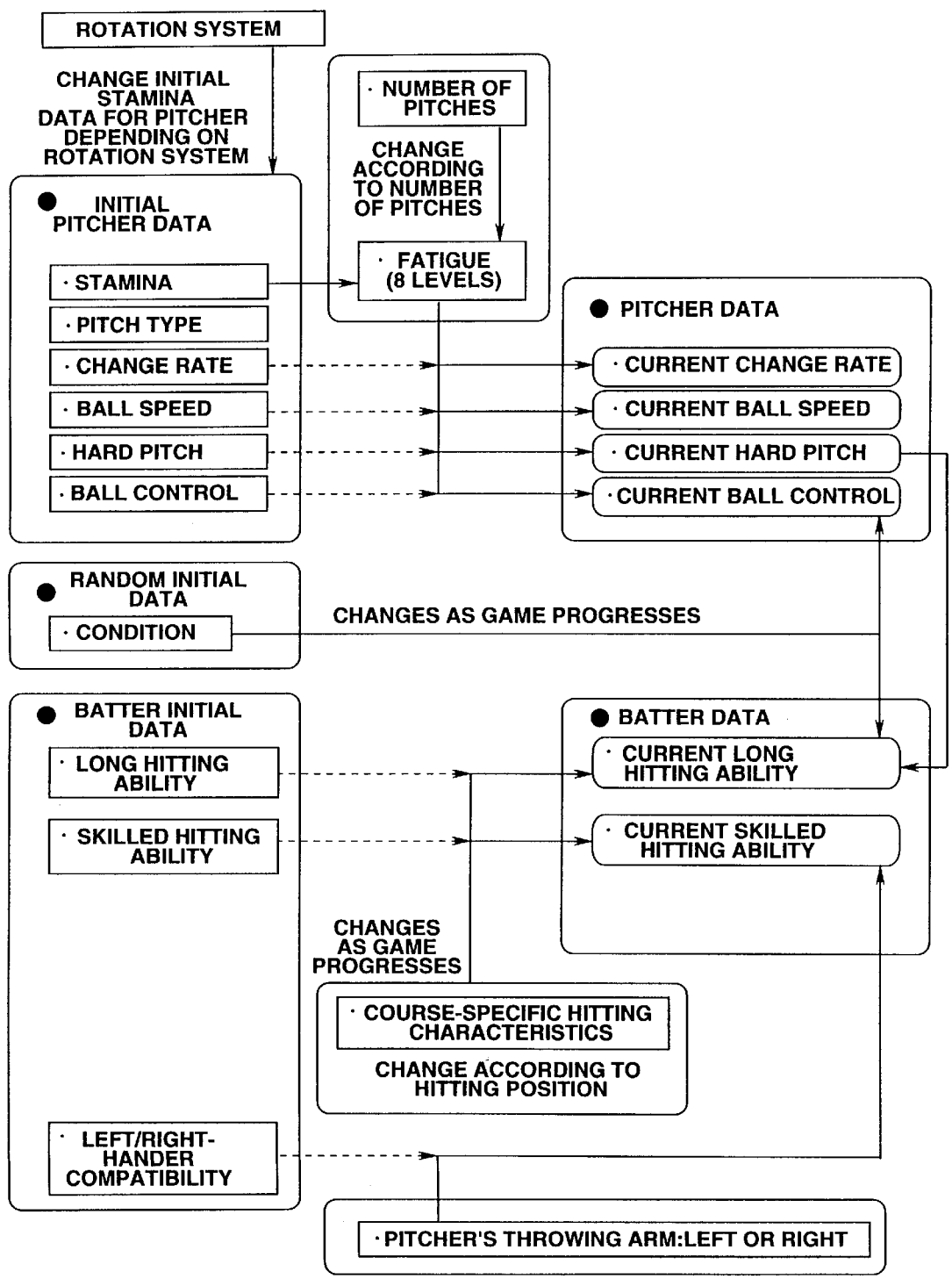
FIG. 12 is a diagram showing an example of player data.

FIG. 12 shows an example of basic data for a batter (player character) as described above. Various parameters for basic data representing the abilities of the player are shown and the relationships between these parameters are displayed. This basic data is previously prepared for each player by means of a game CD-ROM, ROM cartridge, or the like. Moreover, the data is updated according to the results of the game, as the game progresses.

The basic parameters for the pitcher include: initial stamina, type of pitch, range of change, pitch speed, hard pitch, ball control ability, and the like. Stamina is strongly affected by using a rotation system, and it gradually declines as the number of pitches increases. The degree of tiredness of the pitcher is expressed in 8 stages, for example. The degree of tiredness (stamina) affects factors such as the current pitch change rate, pitch speed, hard ball, and ball control ability. Form is also included in the game as a random factor. Ball control ability is also affected by form.

On the other hand, the basic parameters for the batter include parameters such as long hitting ability, skilled hitting ability, compatibility with left and right-handed pitchers, and the like. The current long hitting ability of the batter is affected by the course-specific hit characteristics, the batter's form in the game, the pitcher's ball control ability and hard ball ability. Moreover, the current skilled hitting ability of the batter is also affected by the course-specific hit characteristics, and compatibility with left and right-handed pitchers. Moreover, the course-specific hit characteristics also reflect the past hitting results during the course of the game and vary according to how well the user is playing.

Figure 13:
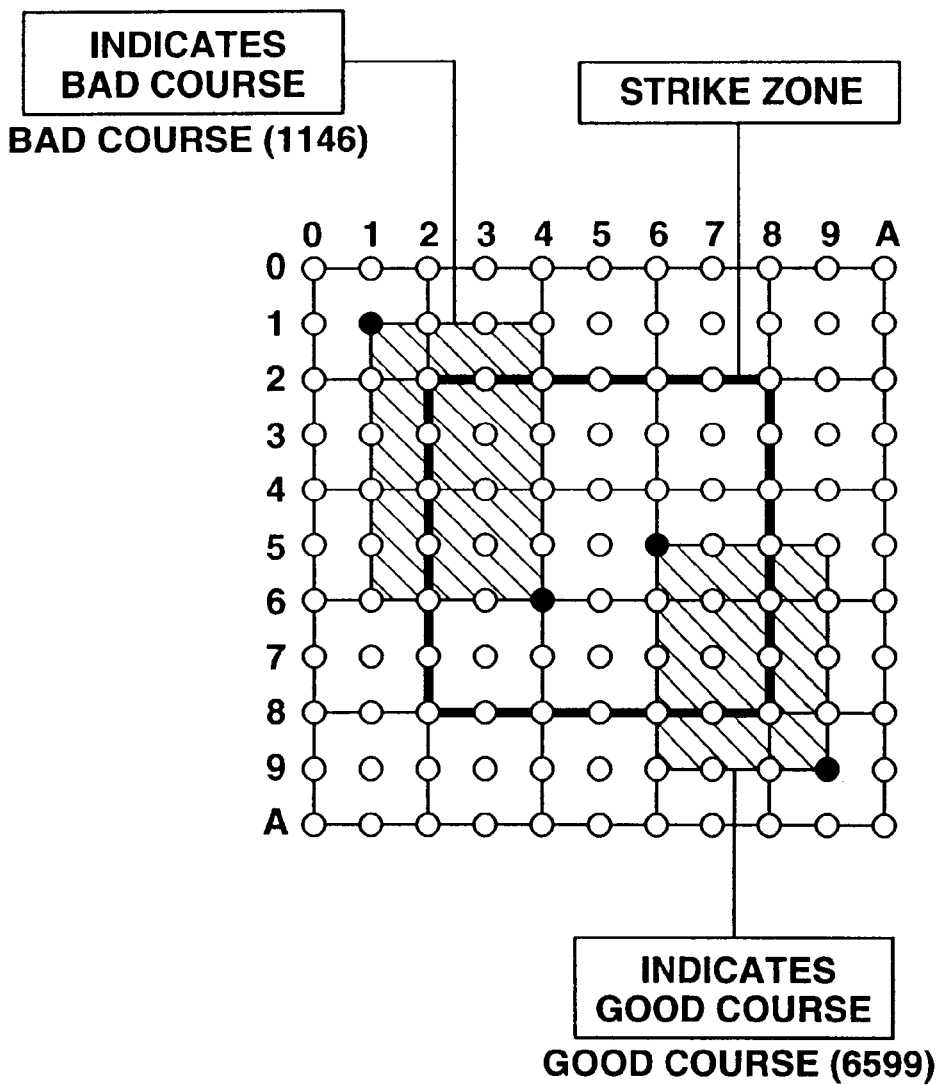
FIG. 13 is a diagram showing a good course and bad course for a batter within a pitched ball zone.

FIG. 13 to FIG. 17 illustrate an example wherein the hitting results for a batter are affected by the past hitting results for each specific pitching course. In this example, the course-specific hit characteristics are stored in the form of matrix data, or the like, as basic data for the player, and are reflected in the hit judgement processing used in the pitching and hitting system. Firstly, as illustrated in FIG. 13, the range in which the hit position can be specified (hit area) is divided into a net shape (matrix shape) and the pitching course or hitting course is represented by matrix data. The course-specific hit information for a player is stored as matrix area information. For example, the square-shaped range of a bad course and a good course for the batter are stored in the form of matrix co-ordinates for two mutually opposing vertices. For example, the region of the bad course and the region of the good course in the diagram are represented by 2 bytes as 1146 and 6599, respectively. If there exist two or more good courses or bad courses in separate regions, then these separate regions can be taken as a single region by linking or approximation processes, and the like. Moreover, either one of these regions can be selected.

In this way, matrix data for a good course and bad course can be stored respectively and independently. Also, favourable or unfavourable weighting data (parameters) may be stored for each individual element of the matrix.

Figure 22:
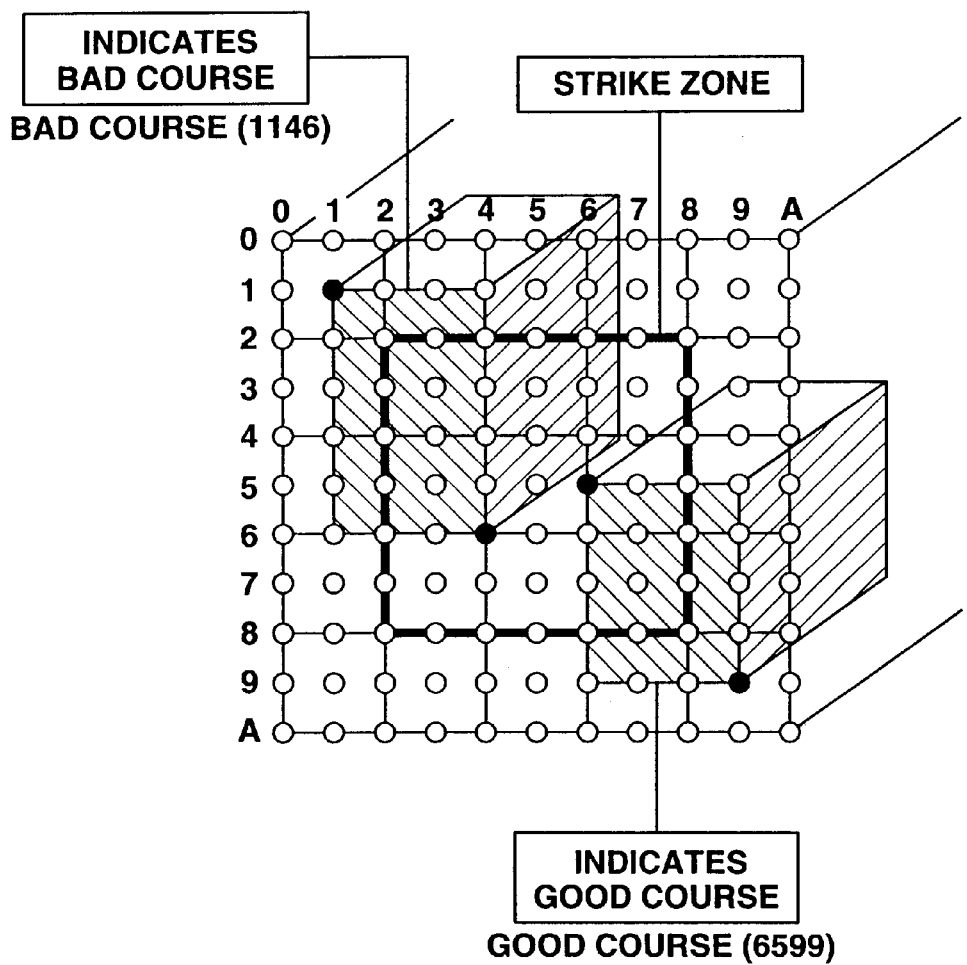
FIG. 22 is a diagram illustrating a case where data for a good course and a bad course is stored as three-dimensional data.

FIG. 22 shows an example wherein the range of a bad course and a good course for the batter are stored in the form of three-dimensional data. In this case also, the three-dimensional regions can be represented by the co-ordinates of two mutually opposing vertices. If the data is stored in a three-dimensional zone, then desirably, the data should also be able to reflect the individual characteristics of players (in the depth direction), with respect to opposite-field hits, pulled hits, and the like.

The outer limits of the bad course region and the good course region can be expanded or restricted in accordance with the hitting performance of the batter in the game. For example, if the hitting performance in the bad course region is poor, then the poor course region is enlarged. If the hitting performance in the good course region is poor, then the good course region is reduced. Conversely, if the hitting performance in the poor course region is good, then the poor course region is reduced. If the hitting performance in the good course region is good, then the good course region is expanded.

Figure 14:
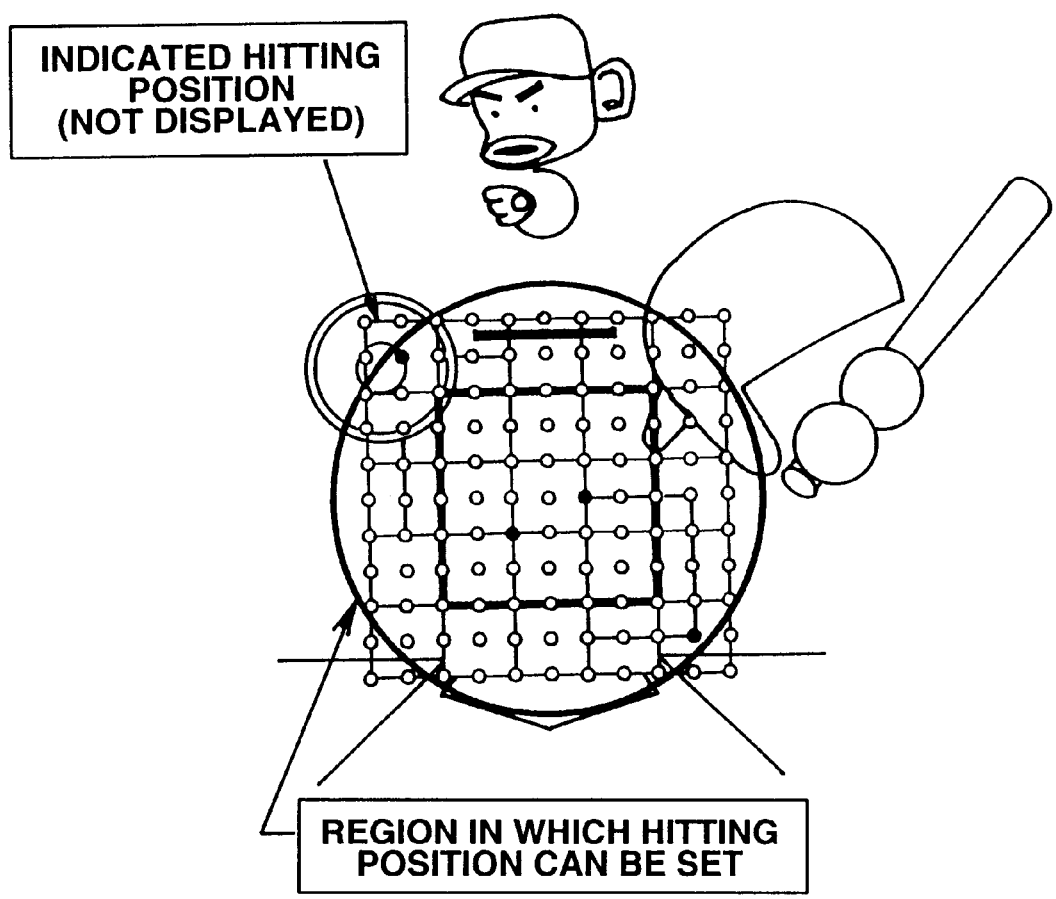
FIG. 14 is a diagram illustrating the creation of a hitting zone matrix and the positioning of a collision object.

FIG. 14 shows an example wherein a matrix co-ordinates system is set on the plane of the strike zone in the pitching and hitting system, to act as a filter. The matrix co-ordinates system is set within the possible hit position specification range, and a collision object which moves according to the hit specification position is located over this matrix system.

Figure 15:
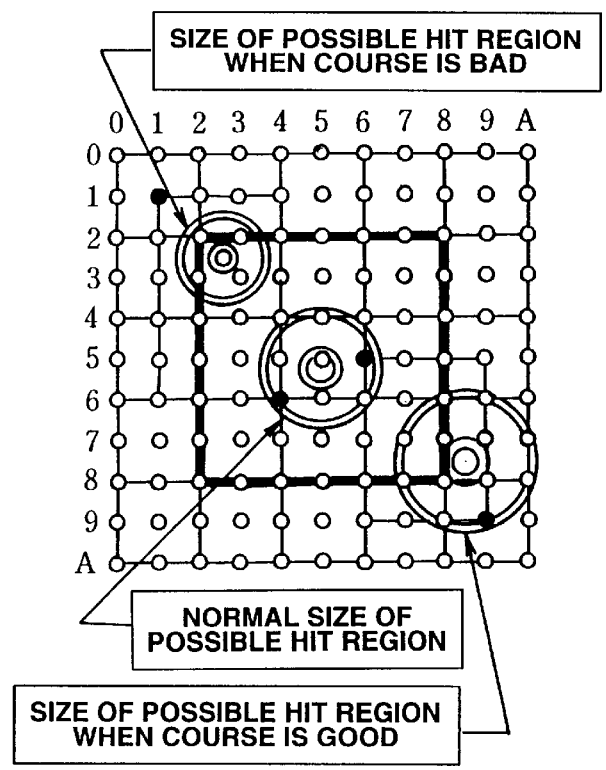
FIG. 15 is a diagram illustrating how the size of a collision object varies depending on whether the course is a good course or bad course.
Figure 16:
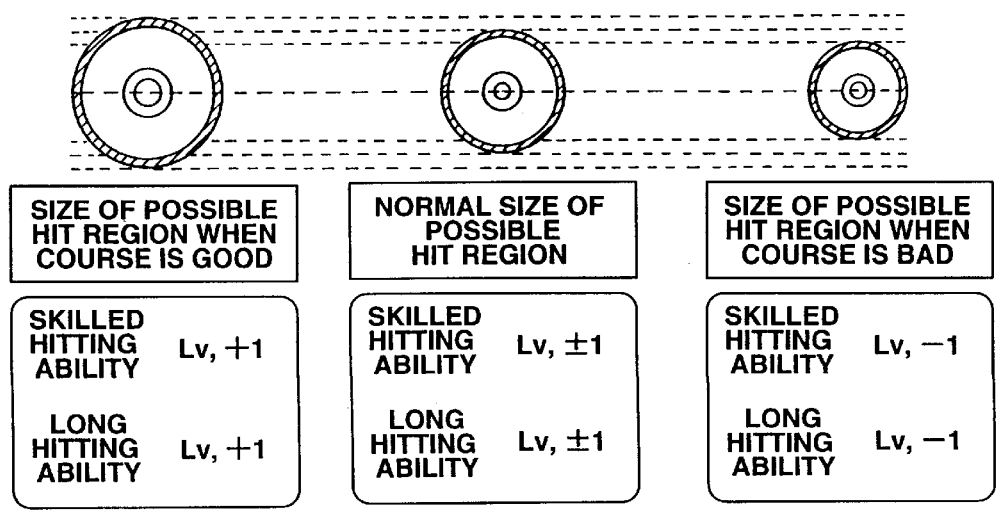
FIG. 16 is a diagram showing an example of changing the size of the collision object according to data for the batter.

FIG. 15 shows an example wherein, when the central position (xi, yi) of the collision object is located over a bad course region for the batter, the size of the possible hit region on the collision object is reduced from its normal size according to how bad the course is for the batter, and when the central position (xi, yi) of the collision object is located over a good course for the batter, then the size of the possible hit region on the collision object is increased from the normal size according to how good the course is for the batter.

FIG. 15 shows an example wherein the size of the possible hit region is changed. The size of the possible hit region can be made to vary in accordance with the skilled hitting ability batter parameter stored as part of the basic player data (FIG. 12). If the central position (xi, yi) of the collision object is located in a bad course region or good course region, then the level Lv of this 'skilled hitting ability' parameter can be reflected in the size of the possible hit region on the collision object, by moving it upwards or downwards in accordance with said course. Moreover, the level Lv of the 'long hitting ability' parameter (described later) which determines the initial speed of the ball in this case can also be made to change simultaneously. Lv is defined, for example, in stages, between ±5. If the Lv values of the 'skilled hitting ability' and 'long hitting ability' are both zero, then the size of the possible hit region will be the normal size. If the Lv value is negative, then the size of the possible hit region will be reduced in accordance with this value, and if the Lv value is positive, then the size of the possible hit region will be increased in accordance with this value.

Apart from altering the size of the collision object as a whole in accordance with the skill level of the hitting course, it is also possible to alter the stable hit region within the collision object, as described hereinafter.

In this way, the characteristics of the batter for each course (course-specific hitting characteristics) can be added to the game aspects of a baseball game, making the pitching strategy for the opposing pitcher more realistic.

Figure 17:
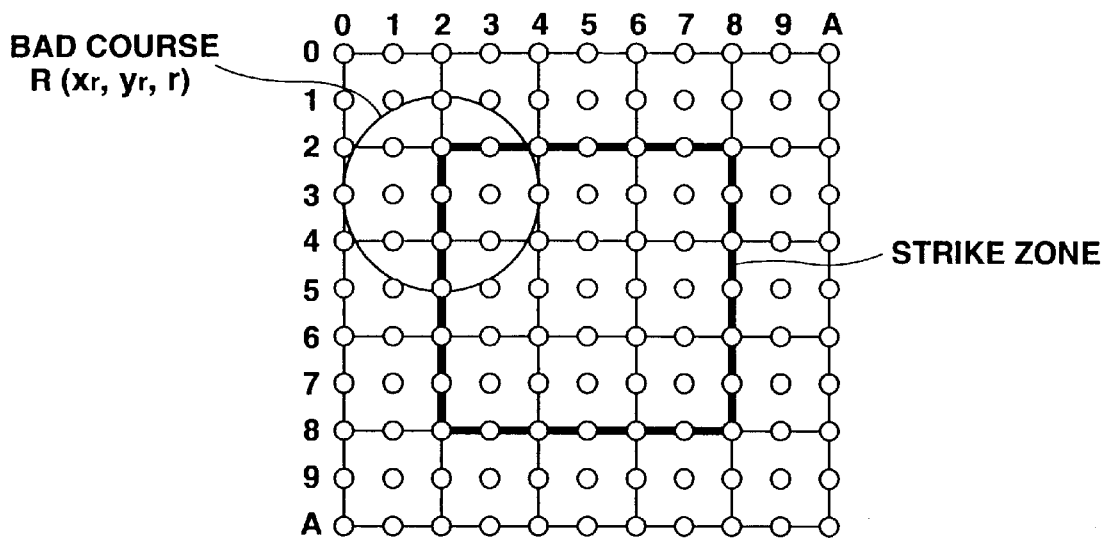
FIG. 17 is a diagram showing an example of storing of further course data.

FIG. 17 shows a further mode for representing good course and poor course regions. In this example, in contrast to the example in FIG. 13, a good course or bad course region is demarcated by a circular shape, rather than a square shape.

The central position of this region R is represented by (xr, yr) and the region R is represented by R (xr, yr, r), where r is the radial distance from the centre.

As further modes for representing these regions, it is possible to use polygonal shapes, such as hexagonal shapes, octagonal shapes, and the like.

Figure 18:
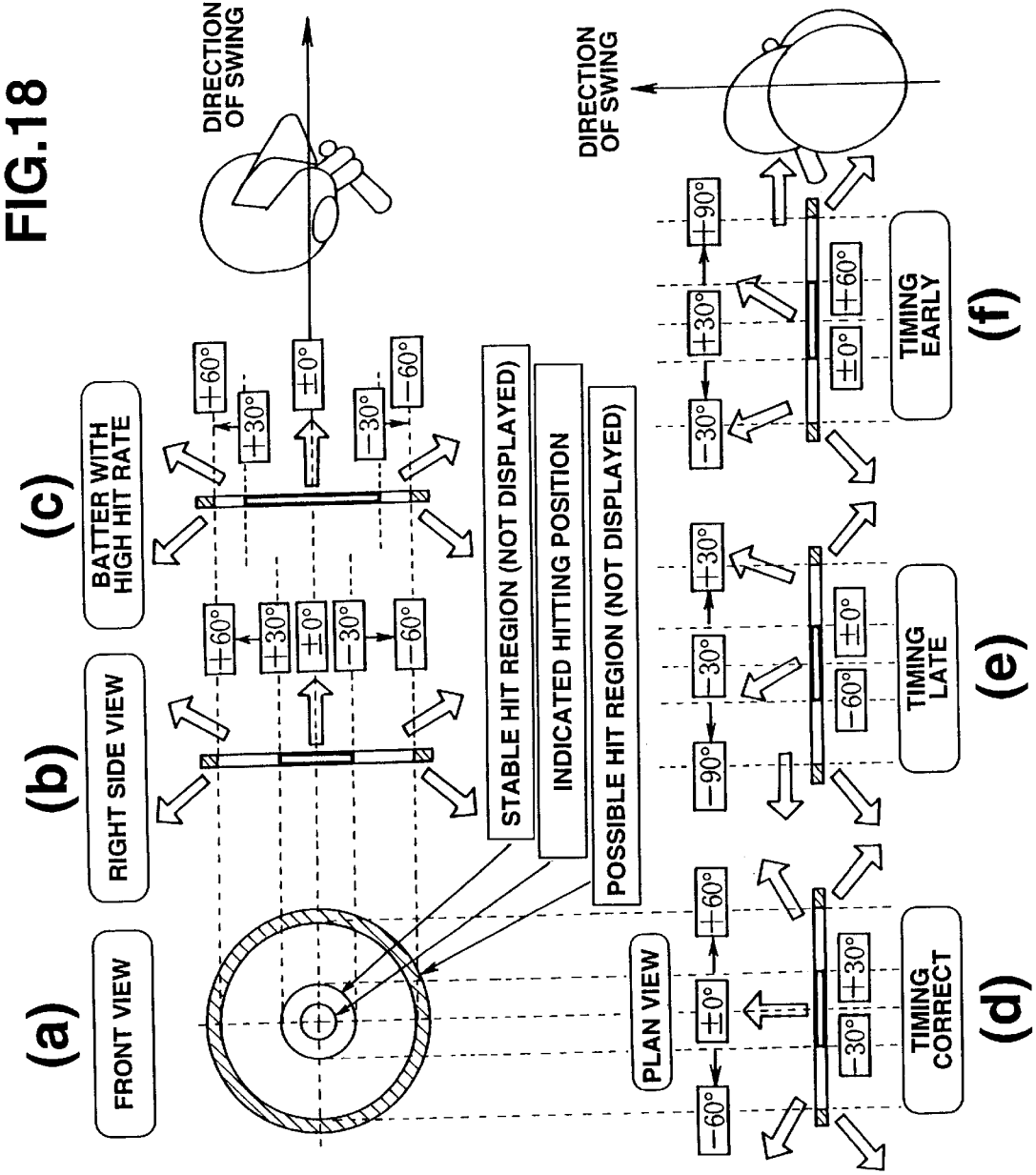
FIGS. 18(a)–18(f) are diagrams illustrating how the direction of flight of a hit ball is determined according to the impact position between the ball and the collision object and the impact timing relating to same.

FIG. 18 is a diagram giving a further description of hit direction judgement processing (FIG. 11) involving a collision object whose size is determined in the manner described above.

In impact judgement processing, a hit result is determined according to impact judgement co-ordinates for the pitched ball with respect to a circular collision object having a centre at the indicated hitting position. Examples of circular collision objects are shown in front view, right side view and top view. The direction of the ball in the vertical plane within the stable hit region is within a ±30° range. The direction of the ball in the lateral plane varies between +30°–0°–30°, in accordance with the timing of the hitting operation (input of button A). As described above, it is possible to vary the size of the stable hitting range according to the batter data, and it is possible to hit the pitched ball stably in a ±30° range within the stable hitting range. Within the possible hit region but outside the stable hitting range, the direction of the ball in the vertical plane is set within a range of ±60° in accordance with the impact position from the centre to the outer edges of the circle of the possible hit region. The outermost part of the possible hit region circle is a rearward foul region, which causes the ball to be chipped rearwards of the batter's box.

As shown by the front view in FIG. 18(a), the stable hit region and the possible hit region are set on the collision object as concentric circular shapes having a centre at the hitting position. The collision object and the two hit regions are not displayed on the screen.

The right-hand side view in FIG. 18(b) shows the shape of the collision object in the direction of the bat swing. If the ball hits the centre of the collision object, then the direction of the flight of the ball will be horizontal (0° direction). If the ball hits the upper edge of the stable hit region, then the direction of the flight of the ball will be 30° above the horizontal direction. If the ball hits the lower edge of the stable hit region, then the direction of the flight of the ball will be 30° below the horizontal direction.

The direction of the ball varies continuously within a range of 0° to ±30° from the centre to the outer edges of the stable hit region, depending on the impact position of the ball.

Moreover, if the ball hits the collision object between the upper edge of the stable hit region and the upper edge of the possible hit region, then the direction of the flight of the ball will be set within a range of 30° to 60° above the horizontal, according to the impact position of the ball. If the ball hits between the lower edge of the stable hit region and the lower edge of the possible hit region, then the direction of the flight of the ball will be set within a range of 30° to 60° below the horizontal, according to the impact position of the ball.

Moreover, as shown in the collision object for a batter having a high hit rate illustrated in FIG. 18(c), in the case of a batter having a high hit rate, the width of the stable hit region on the collision object is set to a larger width than normal, in such a manner that the direction of the flight of the ball becomes more stable.

FIG. 18(d) is a top view of a collision object, showing a case where a batter swings at the pitched ball at a suitable timing.

In this case, if the ball is in the centre of the stable hit region, then the ball will fly off in a perpendicular direction with respect to the face of the collision object (0° direction). From the centre of the stable hit region to the outer edges of the stable hit region, the direction of the ball varies by 30° to left or right from 0° (namely, ±30°) according to the impact position. Moreover, from the outer edge of the stable hit region to the outer edge of the possible hit region, the direction of the ball varies between 30° to left or right and 60° to left or right (±60°) according to the impact position.

FIG. 18(e) illustrates a case where the timing of the batter's swing against the ball is late. If the impact position of the ball is in the centre of the stable hit region, then the ball will fly off in a direction of 30° left (−30°) with respect to the surface of the collision object. Between the centre of the stable hit region and the left-hand outer edge thereof, the direction of the ball will vary from −30° to −60°, depending on the impact position of the ball. Between the left-hand outer edge of the stable hit region and the left-hand outer edge of the possible hit region, the direction of the ball will vary from −60° to −90°, depending on the impact position of the ball. Moreover, between the centre of the stable hit region and the right-hand outer edge thereof, the direction of the ball will vary from −30° to 0°, depending on the impact position of the ball, and between the right-hand outer edge of the stable hit region and the right-hand outer edge of the possible hit region, the direction of the ball will vary from 0° to +30°, depending on the impact position of the ball.

FIG. 18(f) shows a case where the timing of the batter's swing against the ball is early. If the impact position of the ball is in the centre of the stable hit region, the ball will fly off in a direction of 30° right (+30°) with respect to the face of the collision object. From the centre of the stable hit region to the left-hand outer edge thereof, the direction of the ball will vary from +30° to 0°, depending on the impact position of the ball. From the left-hand outer edge of the stable hit region to the left-hand outer edge of the possible hit region, the direction of the ball will vary from 0° to −30°, depending on the impact position of the ball. Moreover, from the centre of the stable hit position to the right-hand outer edge of the stable hit region, the direction of the ball will vary from +30° to +60°, depending on the impact position of the ball, and from the right-hand outer edge of the stable hit region to the right-hand outer edge of the possible hit region, the direction of the ball will vary from +60° to +90°.

FIG. 19 and FIG. 20 give further illustrations of examples where the direction of the ball is judged according to the impact position. The direction of the ball is decided according to ball impact judgement co-ordinates with respect to the circular collision object having a centre at the indicated hitting position 0 used in hit judgement processing. When the direction of the ball is decided according to impact judgement co-ordinates for the ball with respect to the circular collision object, the effect thereof (angle of ball direction) increases towards the outer edges of the possible hit region. The outermost edge portion of the possible hit circle is a rearward foul region, whereby the ball is chipped backwards behind the batter's box.

For example, if the impact position (xi, yi) is within the region xi>0, yi>0 (first quadrant), then the ball will fly in a more rightward direction, the closer the xi value is to x, and the ball will fly in a more upward direction, the closer the yi value is to y.

Figure 21:
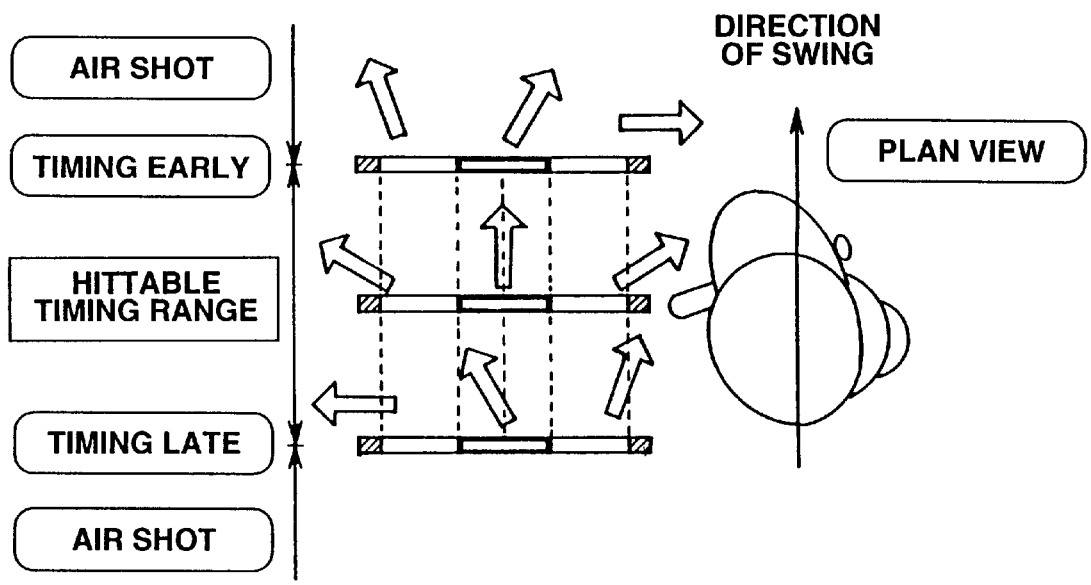
FIG. 21 is a diagram showing an example of the direction of a hit ball depending on whether the swing timing is 'early' or 'late'.

FIG. 21 gives a further illustration of an example where the direction of the ball is judged according to the hit timing. In addition to judging the direction of the ball according to the hit judgement position, the direction of the ball is also affected greatly by the hit timing. The hittable timing is set to a prescribed range either side of the time point at which the pitched ball passes over the approximate centre of the home base in the front/back direction thereof, and any swing by the batter outside this hittable timing range becomes an air shot. If the hit timing is early, then a right-handed batter will cause the ball to fly to the left-hand side and a left-handed batter will cause the ball to fly to the right-hand side. If the hit timing is late, then a right-handed batter will cause the ball to fly to the right-hand side and a left-handed batter will cause the ball to fly to the left-hand side.

In this way, in a baseball game device according to the present invention, the level of skill of the course selected by the batter affects the result of the hit, and hence the game imitates real baseball more closely.

In the foregoing example, the hit result was altered depending on whether the hitting course set by the batter was good or bad, and similarly, it is also possible to devise the game in such a manner that the pitching result is affected depending on whether the pitching course set by the pitcher is good or bad.

In the present embodiment, the size of a collision object is altered according to whether the hitting course set by the batter is good or bad, but in a further example, it is also possible to alter the width of the stable hit region on the collision object according to whether the batter has set a good or bad hitting course.

Furthermore, it is also possible to devise the game in such a manner that the size of the collision object as a whole is altered according to the whether the batter's hitting course is good or bad, and moreover, the width of the stable hit region within the collision object is altered according to batter data (hitting rate, long hitting ability, skilled hitting ability).

The method for changing the collision object according to the suitability of the course or region set by the game character can be applied to game devices for playing ball games other than baseball games, such as cricket, softball, table tennis, soccer, volleyball, tennis, badminton, golf, or the like, or other sports games similar to these ball games. Moreover, in a vehicle-based game, this method can also be applied to a case where the degree of impact between a vehicle and surrounding objects is altered according to whether the driver of the vehicle has set a good or bad course, for example, an inside course or outside course on a bend, a hairpin corner, or the like. Moreover, the moving object involved may be a ball, arrow, vehicle, or the like.

Second embodiment

Next, a game device relating to a second embodiment of the present invention is described with reference to FIGS. 23–36.

The game device according to this second embodiment is also used for playing a baseball game, similarly to the foregoing example, but in this device, it is possible to create a sensation which imitates real baseball more closely, by accurately reflecting difficulty levels, batter skill levels, and the like, in the game.

In particular, the point of difference with respect to the baseball game described in the first embodiment lies in the fact that, for each batter, the quantities indicating the level of difficulty of the overall game and the plurality of quantities representing the skill level of the individual batter are integrated into a single parameter, which can be calculated and controlled in real time.

In the present embodiment, a technique called homing (automatic guidance) is used. Homing refers to a process whereby, if prescribed conditions are satisfied, a second object (the path of travel of the batter's bat) is automatically guided towards a first object (ball) flying through the air, in other words, a collision between the first object and the second object is implemented automatically. The decision regarding whether or not these prescribed conditions are satisfied is based on the way in which the position of the ball in flight and the operational controls implemented by the user relate to certain conditions within a homing range (for example, a circle of radius r, where r is variable). Therefore, the homing range can be treated as a signal parameter which reflects the level of difficulty of the overall game and the skill level of each batter.

To make a comparison with the first embodiment described above, in this first embodiment, the level of skill of the course set by the batter (good or bad course) is used to control the impact judgement range (collision size). In other words, only the skill level of the batter is reflected in the game. The second embodiment differs significantly from this in that both the skill level of each batter and the level of difficulty of the overall game can be adjusted in an integrated manner, simply by dealing with a single parameter indicating the homing range. Thereby, the game contents can be adjusted more finely, and hence a game which is more realistic and more appealing to play can be provided.

This game device is described below. Since the second embodiment may also use a different type of game device to the first embodiment, the hardware composition shall be described first.

Figure 23:
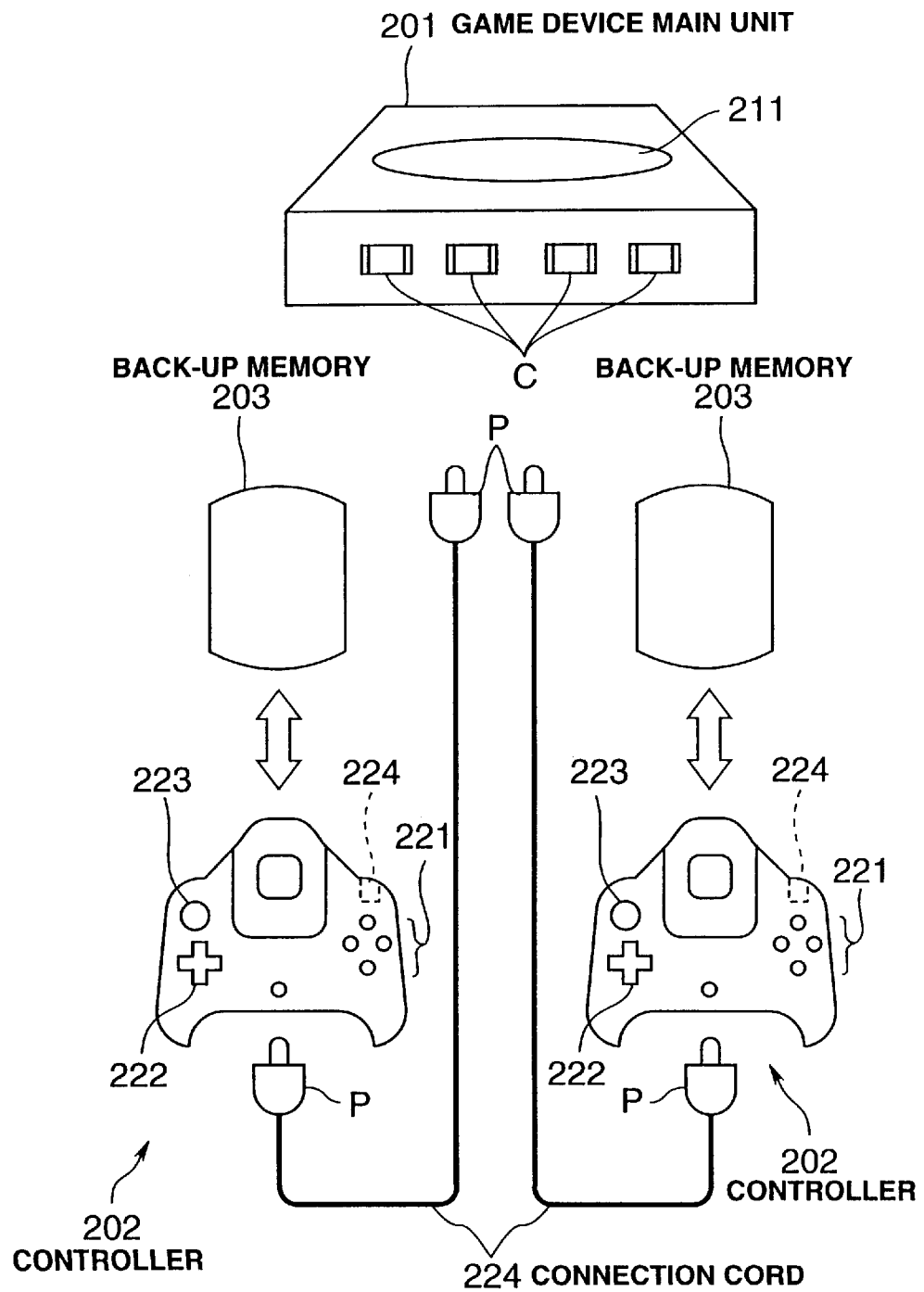
FIG. 23 is a diagram showing an overview of a game device according to a second embodiment.
Figure 24:
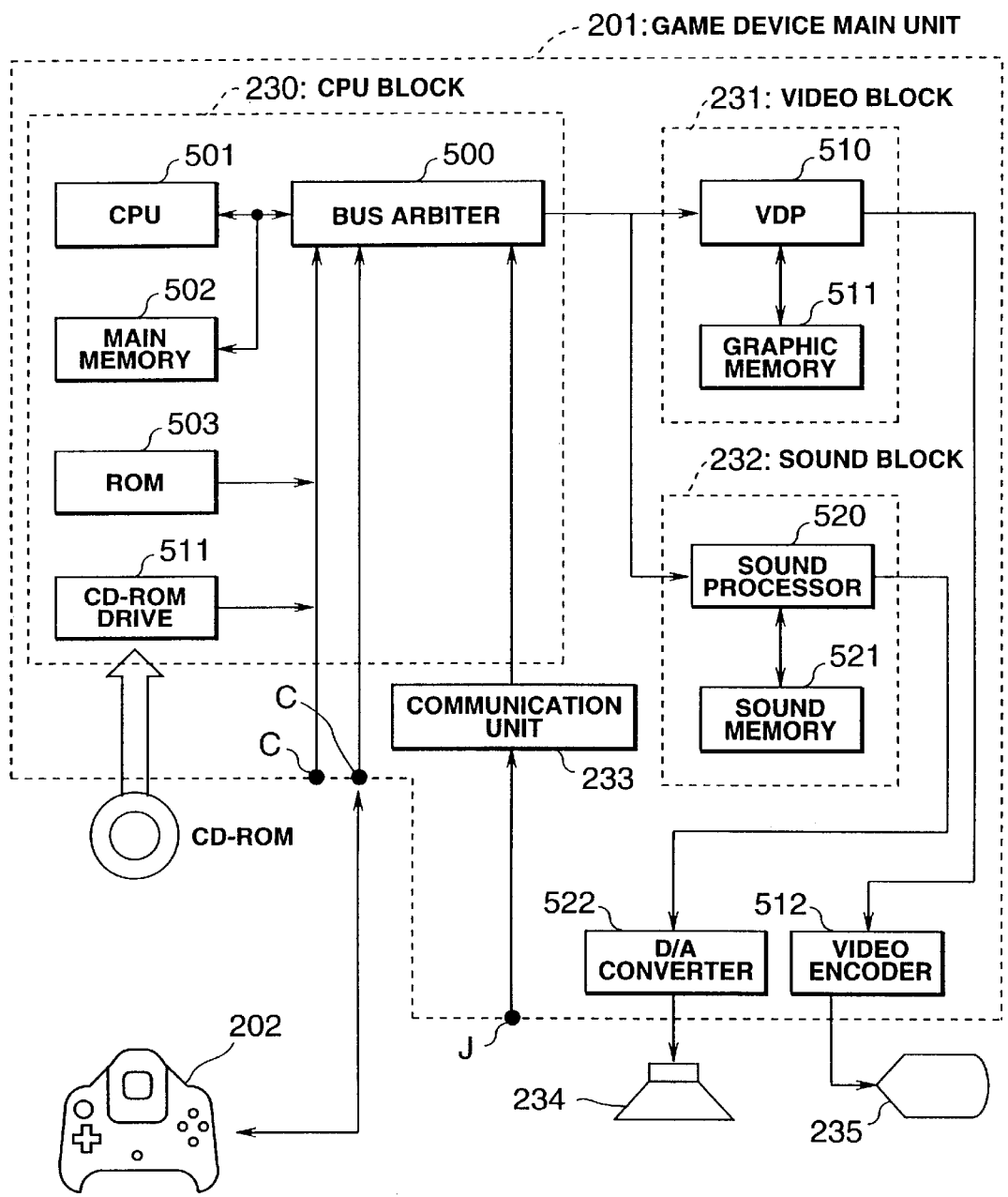
FIG. 24 is a block diagram showing the electrical composition of a game device according to the second embodiment.

FIG. 23 is an external view of a game device relating to the second embodiment, and FIG. 24 is an electrical hardware block diagram of same.

As illustrated in FIG. 23, this game device comprises a game device main unit 201, a controller 202, and a sub-unit 203, which are mutually connected.

The game device main unit 201 is a control unit for controlling the execution of games. A plurality of controllers 202 can be connected to the game device main unit 201 by means of connectors C. Furthermore, the game device main unit 201 also comprises a CD-ROM drive 211, into which a storage medium, such as a CD-ROM, can be inserted in a removable fashion.

The controller 202 comprises an operating section which is operated by a player, provided with an operating button group 221, a cross key 222, analogue direction key 223, R trigger switch 224, and the like. The controller 202 can be connected to the game device main unit 201 by a connection cord 204 provided with a connector P. In particular, when the player on the batting side is batting, he or she can move the swing point represented by the middle of the bat, by operating the analogue direction key 223, and he or she can give a command to start a swing, by operating the R trigger switch 224. Other operations are set in the same manner or a similar manner to the first embodiment. Moreover, the controller 202 is also provided with a removable back-up memory 203. The game device main unit 201 has a composition similar to a computer device, and as shown in FIG. 24, it comprises a CPU block 230, video block 231, sound block 232, communications device 233, and the like.

The CPU block 210 comprises a bus arbiter 500, CPU 501, main memory 502, ROM 503 and CD-ROM drive 511. The bus arbiter 500 is composed in such a manner that it controls data transmission and reception by allocating bus occupation time to the respective devices mutually connected via the bus. The CPU 501 is able to access the main memory 502, ROM 503, CD-ROM drive 211, video block 231 and sound block 232, and via the controller 202, the back-up memory 203 also.

The CPU 501 performs various processing and control operations required to execute the game, and it is able to transfer image data to a graphics memory 511 and sound data to a sound memory 521. The ROM 503 is a storage region for loading an initial program. The ROM 503 is an element of the storage medium, and it previously stores programs required in the processing implemented by the CPU 501. A CD-ROM, or the like, may also be used as a storage medium.

The CD-ROM drive 211 uses a CD-ROM as a storage medium for externally supplied data, but the invention is not limited to this, and compositions enabling other types of storage device to be read are also possible. A composition wherein programs are transferred to the memory by means of a communications device 233 may also be adopted. If this type of composition is used, data may be transferred from a fixed disk in a remote server, or the like.

The video block 231 comprises a VDP (Video Display Processor) 510, a graphics memory 511 and a video encoder 512. According to this composition, the video block 231 is comprised in such a manner that it can reproduce three-dimensional image data or movie images, for example. The video encoder 512 is composed in such a manner that it can convert the image data regenerated by the VDP 510 to a prescribed television signal based on NTSC format, or the like, and output this signal to an externally connected main monitor 235 (cathode-ray tube, such as video receiver, or the like).

The sound block 232 comprises a sound processor 520, sound memory 521 and a D/A converter 522. According to this composition, the sound block 232 is composed in such a manner that it can output sound signals by carrying out sound synthesis on the basis of waveform data. The D/A converter 522 converts the sound data generated by the sound processor 520 to an analogue signal, which is output to an externally connected speaker 234 (speaker of video monitor or speaker of sound device).

The communications device 233 is a modem or terminal adapter, for example, which can be connected to the game device main unit 201 and functions as an adapter for communication between the main unit 201 and external circuits. The communications device 233 receives data transmitted by a server providing games, such as an Internet server, connected to a public circuit network, and it supplies this data to the bus of the CPU block 230. The public circuit network may be a subscriber circuit, dedicated circuit, radio or line-based circuit.

Next, the operation of the present embodiment will be described, focusing on the processing implemented when the batter is batting. Processing relating to attacking operations other than batting performed by the attacking team, and processing for operations relating to pitching and defense by the defending team are the same or similar to the first embodiment.

Figure 25:
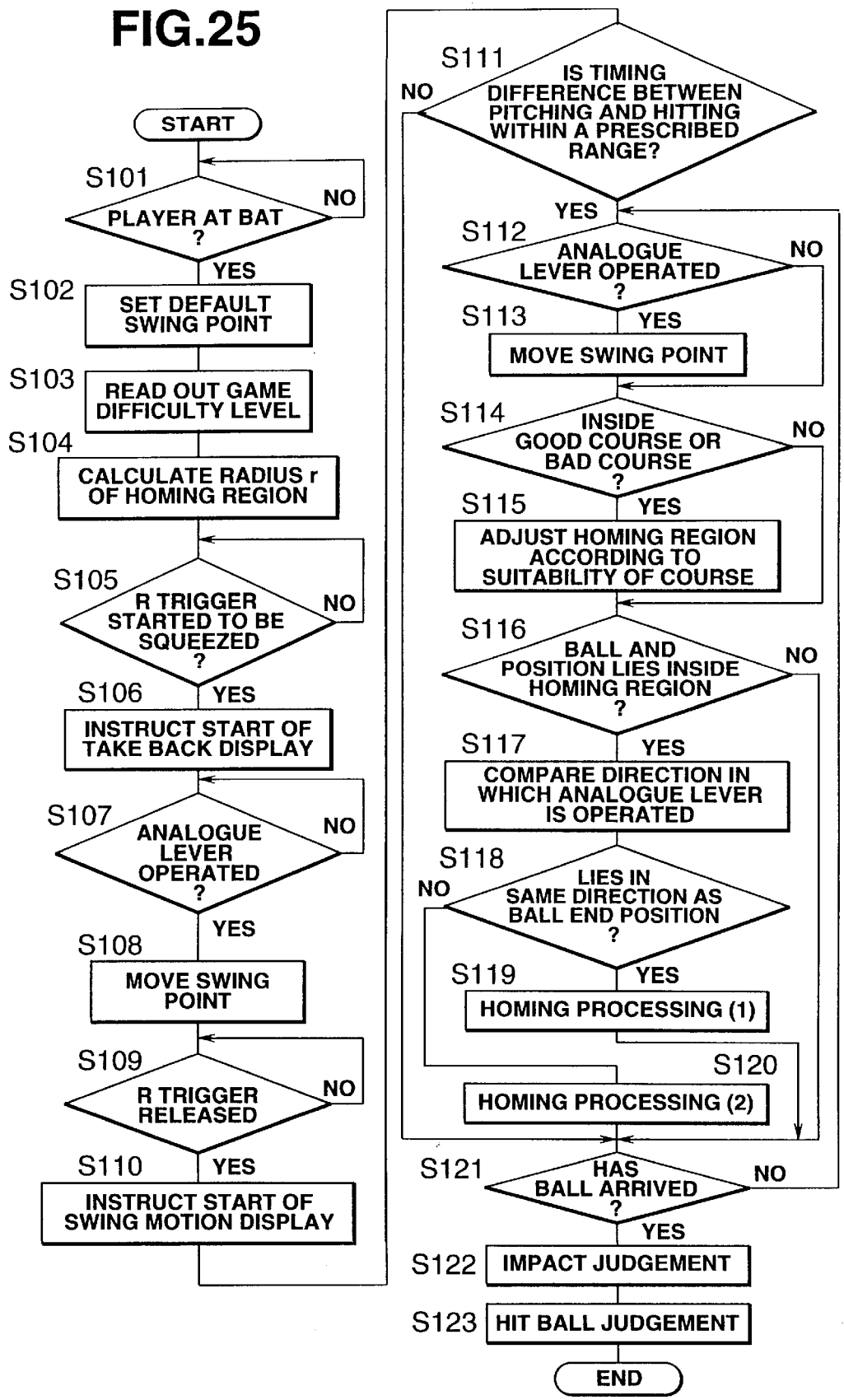
FIG. 25 is a flow chart showing the outline of CPU processing according to the second embodiment.

CPU 501 executes the processing shown in FIG. 25 for each batter. When the processing in FIG. 25 is started, the CPU 501 ascertains whether or not one of the players is at bat (step S101), and then sets a default value for the swing point SP (step S102).

Figure 26:
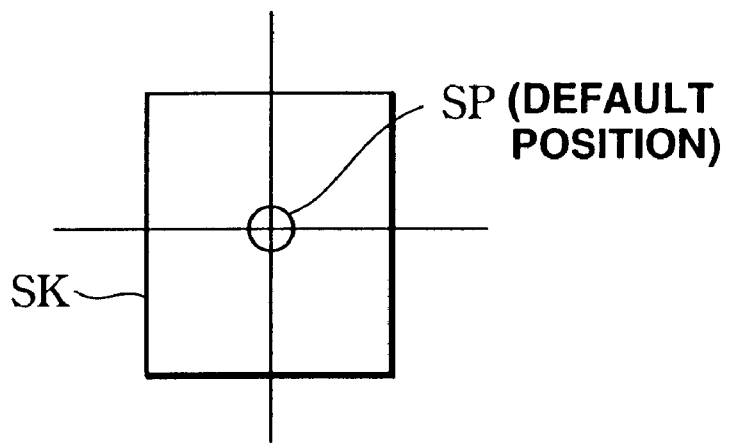
FIG. 26 is a diagram for explaining homing.

The swing point SP is an imaginary point representing the point through which the centre of the bat held by the batter passes, and it is not displayed on the monitor screen 235 (in other words, the swing point is not visible to the users). The default value for the swing point SP is the central position of the strike zone SK, as illustrated in FIG. 26. The strike zone SK is an imaginary zone set at a prescribed location, such as the front edge or dead centre of the home base, or the like, for each batter, and it is not displayed on the monitor screen 235, either, but is used for calculation by the CPU 501 only.

The centre of the bat is the region which simulates the region on the surface of the bat where the reactive force applied to the ball is highest, as in real baseball. Therefore, in the description of FIG. 26, the swing point SP is represented by a circle corresponding to the diameter of the centre portion of the bat.

Figure 27:
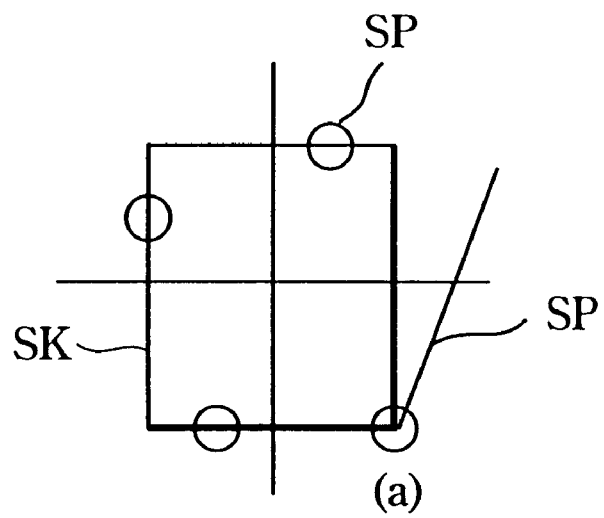
FIG. 27 is a diagram for explaining homing.

This swing point SP can be moved by controlling the analogue direction key 223, and when the swing point SP is changed, the path of travel of the bat centre when the bat is swung can be altered. The swing point SP is not set in such a manner that it moves outside the strike zone SK. As shown in FIG. 27, the swing point SP is limited by the boundary lines of the imaginary strike zone SK, and if the swing point SP is moved to the outermost position on one of the bottom corners (see point a on FIG. 27), then the front end of the bat can be set such that it can hit a ball passing along a course at the very edge of the strike zone (point a).

Thereupon, the CPU 501 reads out the value of a coefficient a representing the level of difficulty of the game, and it calculates the size of the homing region RHG (step S103, S104).

The value of this coefficient a is stored in such a manner that it can be changed at any time during the game, via the controller 222.

As described above, homing is a technique for guiding the swing point SP automatically to a travelling ball, and as described later, homing is only carried out when the homing region RHG satisfies certain prescribed conditions. As illustrated in FIG. 28, in the present embodiment, the homing region RHG is an imaginary region represented by a circle centred on the strike point SP. It is not shown on the monitor.

The radius r of the homing region RHG is calculated in real time from the start of the bat swing until bat and ball impact judgement processing, in accordance with the batter's skilled hitting ability and the coefficient, a, representing the level of difficulty of the game, by using equation $$r = (\text{skilled hitting ability} \cdot a \cdot 0.01) + 0.04$$

Here, 0.01 is a prescribed coefficient and 0.04 is the radius of the bat. The skilled hitting ability is previously determined within a range of 0–100 according to the skill level of the batter, and the higher the batter's batting skill, the higher this value. If the batter has a skilled hitting ability of 0 then the homing region is 0, (r=0: no homing), and the direction of the ball is determined simply by the state of impact between the ball and the swing point SP based on the centre of the bat. In other words, since the homing region becomes larger, the greater the skilled hitting ability of the batter, even in cases where the swing point SP is distant from the ball, provided that it satisfies the prescribed conditions described below, the bat is made to hit the ball, thereby representing a batter having good skilled hitting ability.

Furthermore, the coefficient, a, representing the level of difficulty of the game can be set between 1 and 0, according to 10 stages of difficulty ranging from 1 to 10. The standard (default) difficulty level 5 is set such that a coefficient of a=0.1 is used. For example, if this coefficient a=0.1, then in the case of a batter having a skilled hit ability of 100, ¼ of the strike zone will be a homing region (see FIG. 28).

Therefore, if the user does not specify a particular level of difficulty, this default value is used to calculate the radius of the homing region RHG.

Figure 30:
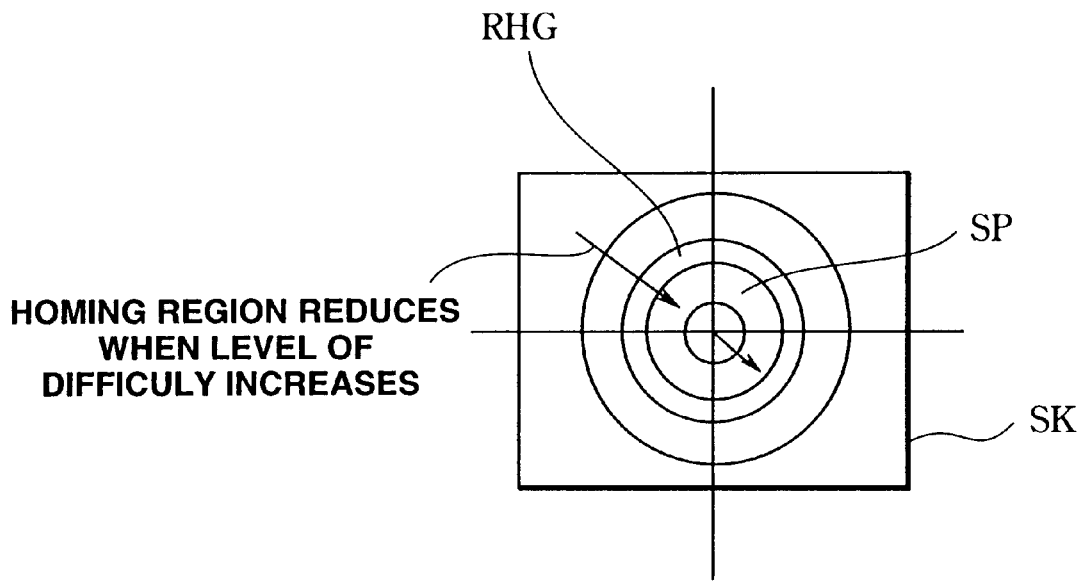
FIG. 30 is a diagram for explaining homing.
Figure 31:
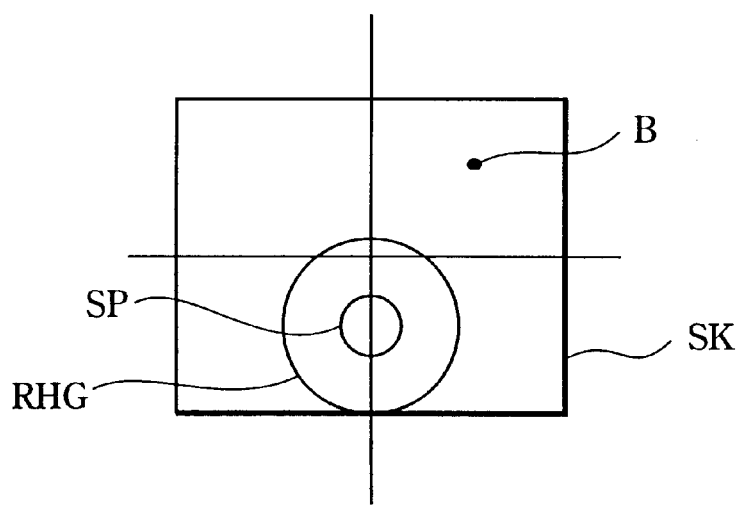
FIG. 31 is a diagram for explaining homing.

FIG. 29 shows the relationship between the ratio of the strike zone SK occupied by the homing region RHG and the level of difficulty. FIG. 30 illustrates a state where the circular area of the homing region RHG changes according to the level of difficulty. For batters of the same skilled hitting ability, the surface area of the homing region HRG will become smaller, the higher the level of difficulty of the game, and consequently it will become harder to make the bat strike the ball.

In this way, the homing region HRG set by the processing in steps S103 and S104 is a region which corresponds to the skilled hitting ability of the individual batter currently standing at bat, and the level of difficulty specified by the player according to his or her wishes.

In this way, when the preparations have been completed, the CPU 501 waits for operating information relating to a pitching operation by the player. In other words, it judges whether or not the R trigger switch 224 has started to be squeezed (step S105). The player watching the monitor screen normally matches this squeezing action to the timing at which the opposing pitcher character pitches the ball. If the CPU 501 judges YES at this stage, in other words, if the R trigger switch 224 has started to be squeezed, the CPU 501 gives a command to start a series of display processing steps for depicting the batter character at bat taking a back swing (Sl06). In an actual baseball match, a large number of batters perform the back swing operation immediately before hitting the ball, and therefore by adopting this display processing, the sense of realism conveyed by the movements of the batter character is enhanced.

Thereupon, the CPU 501 determines whether or not the analogue direction key 223 has been operated, and if it has been operated (YES), then the position of the imaginary swing point (SP) (not displayed) is moved (steps S107, 108). This movement processing involves instantaneous processing for adjusting the swing point SP position, which allows a player watching the image of a ball pitched by the opposing pitcher character passing through the air on the monitor to perform operational controls within an extremely short period of time. If the swing point SP moves, then the homing region RHG surrounding this point also moves accordingly.

Thereupon, the CPU 501 determines whether or not the R trigger switch 223, which has been squeezed until now, has been released (step S109), and if the answer is NO (not released), then the CPU 501 returns to step S107. The operation of releasing the R trigger switch 223 imitates, as closely as possible, the operation of the batter character, who has been taking a back swing until this point, starting to swing the bat in a forward direction. If the CPU 501 judges YES (the R trigger switch has been released) at step S109, then the CPU 501 instructs a display of a series of swing operations performed by the batter character (step S110).

CPU 501 reads out the timing of the instant at which the pitcher character pitches the ball and the timing of the instant at which the batter character starts to swing the bat, and it judges whether the difference between these timings lies within a prescribed range (step S111). Thereby, it can detect a state where the batter swings the bat when the pitcher has not yet pitched the ball, or a state where the batter swings the bat too late and the ball is already held in the mitt of the defense character (air shot). In cases such as these, it is possible to avoid the homing correction processing described later. In other words, if the CPU 501 judges NO at this stage (the timing difference lies outside the prescribed range), then the processing in the subsequent steps S112–S120 is not implemented.

By contrast, if the CPU 501 judges YES at the judgement step in step S111 (timing difference lies within prescribed range), then firstly, the operational position of the analogue direction key 223 is read in, and if this key has been operated, then the position of the swing point SP is readjusted (steps S112, S113). Thereby, even though it involves an instantaneous operation, the position of the swing point SP can be readjusted during the swing. If the swing point SP has moved, then the homing range RHG surrounding this point also moves accordingly.

Figure 35:
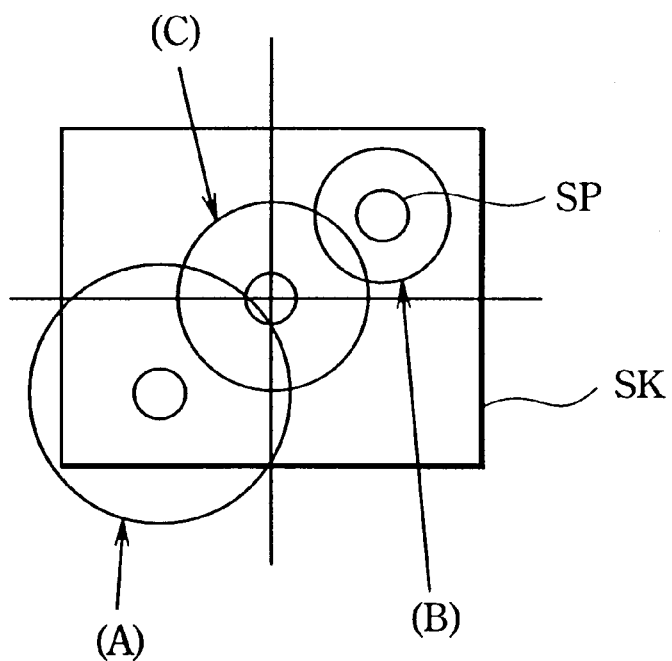
FIG. 35 is a diagram for explaining homing.

Thereafter, it is judged whether or not the centre of the current homing region RHG lies within a bad or good hitting course for that batter on the strike zone (step S114). If the CPU 501 judges YES at this step, then the homing region is further adjusted depending on whether the course is good or bad (step S115). Specifically, if the centre of the current homing region RHG lies on a good hitting course (hitting region), then the cursor for the homing region RHG, which is not displayed on the screen, is enlarged by a factor of 1.1, for example (see (A) in FIG. 35), and conversely, if the centre of the current homing region RHG lies on a poor hitting course (hitting region), then the cursor for the homing region RHG, which is not displayed on the screen, is reduced by a factor of 0.9 (see (B) in FIG. 35). The homing region RHG indicated by (C) in FIG. 35 is the default value. If the CPU 501 judges NO at step S114, in other words, if the current homing region RHG does not lie on either a good course or a bad course, then no correction processing is carried out.

Moreover, the CPU 501 also determines whether or not the central point of the end position B of the pitched ball lies within the homing region RHG (step S116). The ball end position B is a position in the plane above the home base at which it can be hit by the batter character (for example, a position within the strike zone), and until the ball arrives at this plane, it represents a predicted arrival position projected onto this plane. At step S116, if the CPU 501 judges NO (in other words, if the central point of the ball end position B does not lie inside the homing region RHG), then no homing correction processing is carried out. In other words, the processing in steps S115–S120 is skipped.

Figure 32:
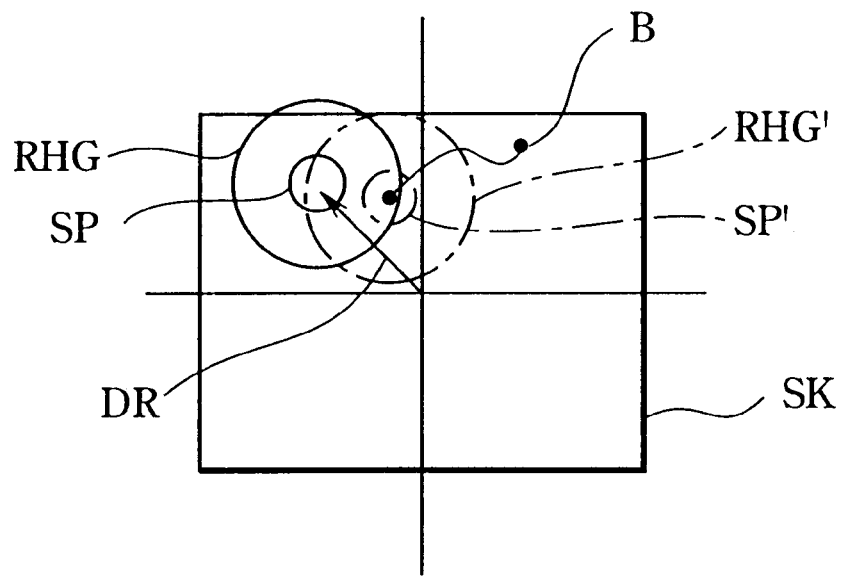
FIG. 32 is a diagram for explaining homing.
Figure 33:
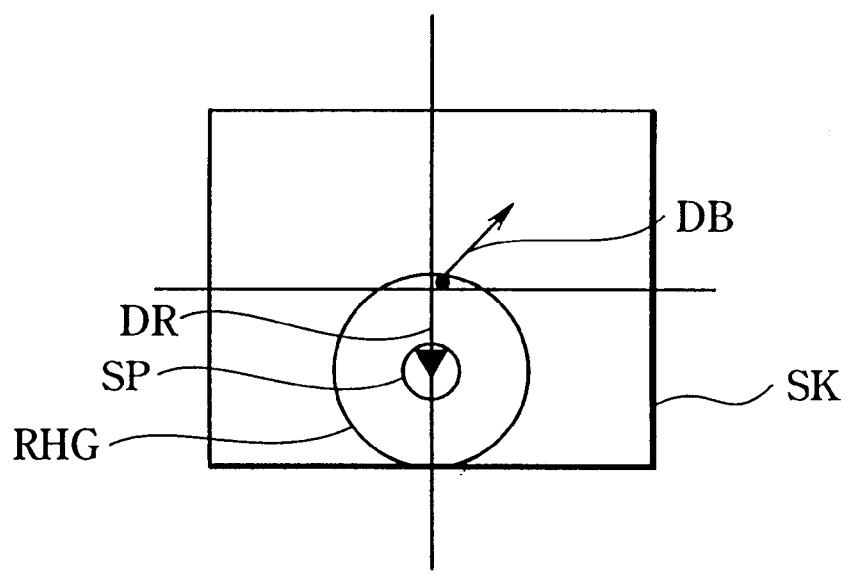
FIG. 33 is a diagram for explaining homing.

However, if the central point of the ball end position B does lie within the homing region RHG, as illustrated in FIG. 32 and FIG. 33, then the CPU 501 judges YES at step S116.

Figure 34:
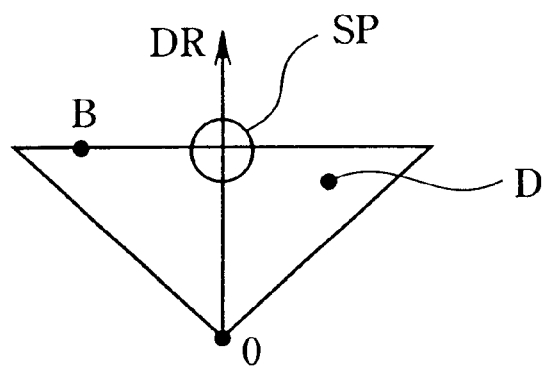
FIG. 34 is a diagram for explaining homing.

Thereupon, the operational direction DR of the analogue direction key 223 as operated by the player is detected and the CPU 501 determines whether or not this operational direction DR lies in the same direction as the ball end position B (step S117, S118). As illustrated in FIG. 34, this judgement process determines whether or not the ball end position B lies inside a region D extending, for example, 45° to the left and right of the straight line (operational direction) DR linking the centre 0 of the strike zone SK and the centre of the swing point SP. By adjusting the left and right angles of this region, it is possible to adjust whether homing correction is implemented or not implemented.

The judgement on whether B and DR lie in the same direction is provided in order to identify whether or not the player has controlled the swing point SP in recognition of the course of approach of the ball, and it serves to eliminate contradictory situations where a good hit might still be made in a case where the swing point has been operated in a direction which is unrelated to the course of the ball.

Thereupon, if the CPU 501 judges YES (same direction) at step S118, then as illustrated in FIG. 32, homing is implemented whereby the swing point SP is made to match the ball end position B (homing from the state indicated by the solid line in the diagram to the state indicated by the dotted line) (step S119).

By contrast, if the CPU 501 judges NO (not in same direction) at step S118, as illustrated in FIG. 33, then the operational direction DR and ball direction DB (direction linking the ball end position to the centre of the strike zone) are widely separated. In this case, as described previously, homing is still carried out in such a manner that the swing point SP moves towards the ball end position B, but homing is not implemented for the absolute value of the distance between the centre of the strike zone SK and the ball end position B (step S120). Therefore, the ball does not meet the centre of the bat, and even if the ball does hit the bat, a state where it grazes the bat or hits near the grip of the bat is calculated.

After this processing has been completed, the CPU 501 judges whether or not the ball has reached the home base, and if it has still not reached the home base (NO), then the processing in steps S112–S119 is repeated (step S121). If the CPU 501 judges that the ball has reached the home base, then when the path of the bat and the path of the ball intersect on the Z axis, ball and bat impact judgement processing and ball judgement processing are carried out successively, in a similar manner to the first embodiment described above (steps S122, S123). Display processing is carried out in a similar manner to the first embodiment.

In this way, in the present embodiment, the homing region RHG is calculated according to the game difficulty level and the batter's individual skilled hitting ability, and this homing region RHG is set around the swing point SP in a virtual fashion.

Thereupon, the batter character starts to swing the bat, aiming at the ball end position B lying within the swing point SP or homing region RHG at the point that the R trigger switch 224 was released. Even after this swing has started, the player is able to change the position of the swing point SP (position of the homing region RHG) by controlling the analogue direction key 223. If such a change is made, the speed of movement of the swing point SP varies linearly in proportion to the force applied to the analogue direction key, but the speed of the swing itself does not change.

Consequently, the centre of the bat passes through the swing point SP whilst maintaining a uniform swing speed.

Furthermore, during this swing operation, if the homing region RHG lies on a good course or bad course for the batter, then the radius of the homing region RHG is corrected.

Figure 36A:
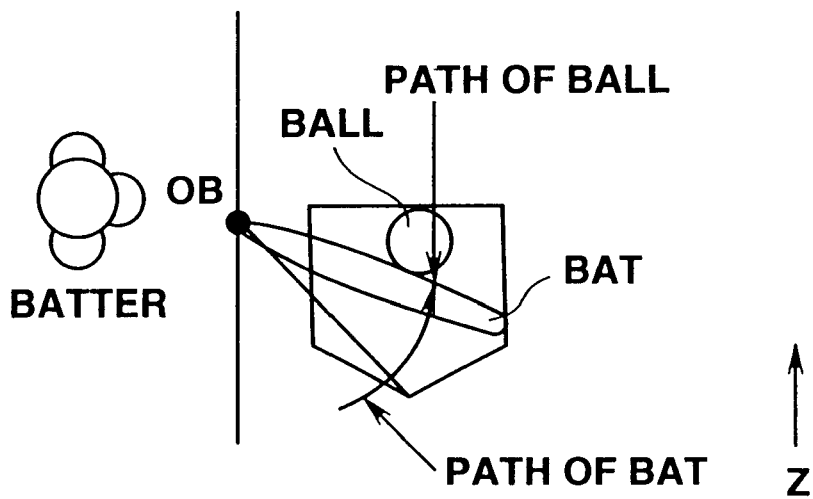
FIGS. 36(*a*) and 36(*b*) are diagrams for explaining homing.
Figure 36B:
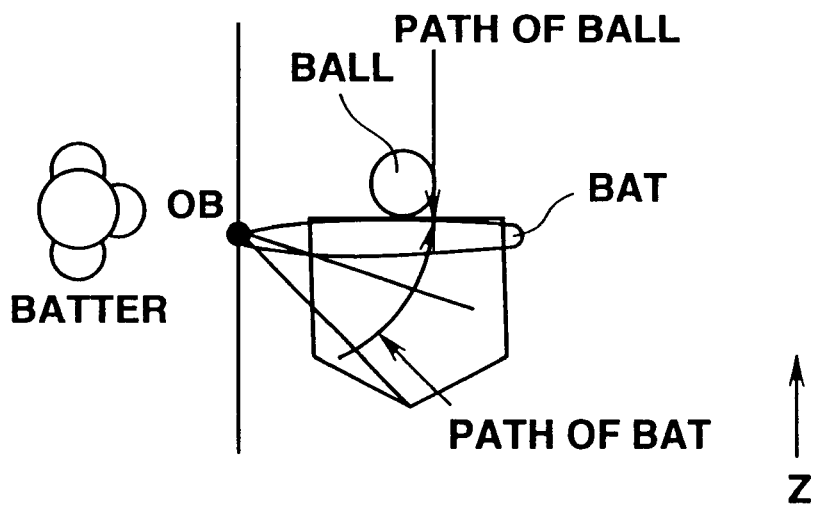

Homing is implemented when condition (1), relating to whether the centre of the ball end position B lies inside the homing region RHG, is satisfied. More specifically, in addition to this condition, homing is also carried out in accordance with condition (2), relating to whether or not the player operates the analogue direction key in the same direction as the ball end position. If both of these two conditions (1), (2) are satisfied, then the homing process controls and guides the centre of the strike point SP in such a manner that it matches the ball end position. If only condition (1) is satisfied, then homing is not implemented fully, but is carried out in such a manner that the absolute distance between the centre of the strike zone and the ball end position remains. No homing process is carried out when condition (1) is not satisfied. Therefore, as illustrated in FIGS. 36(*a*) and (*b*), the correction processing for the homing region (steps S119, S120 in FIG. 25) is carried out in real time from the start of the swing until the paths of the bat and the ball intersect on the Z axis. Homing is carried out within the plane formed by this intersection point and the centre of rotation of the bat 0B. In the case of FIG. 36(*a*), the timing of the start of the swing, in other words, the timing at which the R trigger switch 224 was released, is slightly late.

When homing has been carried out, the bat hits the ball, and the ball flies downwards if the bat hits the top part of the ball and the balls flies upwards if the bat hits the bottom part of the ball, without making any distinction with regard to whether the swing itself is an upward swing or a downward swing. Moreover, the timing at which the bat and ball collide also determines whether the ball flies towards the centre, to the right or to the left.

In this way, it is possible to provide a baseball game wherein the game can be varied and given depth in a way not achievable in the prior art, by adjusting a single parameter, namely, the homing region RHG, combining the difficulty level of the whole game and the hitting capabilities (attacking power, good and bad course) of individual batters, by means of relatively simple processing.

For example, when a player is playing against a beginner, the difficulty level can be raised when the first player's team is batting, thereby restricting the homing region and making homing less likely to occur, and hence making is possible to have an even contest with the beginner. Also, by adjusting the difficulty level depending on whether a certain player is in good batting form or poor batting form, it is possible to provide a game which accurately represents good and bad form, in a simple manner.

Moreover, since the swing point can be revised instantaneously even after the swing has started, a hitting operation such as 'following a curve ball', or the like, as witnessed frequently in a real baseball match, can be provided.

Moreover, according to the game of the present embodiment, it is possible to provide a sense of control which more closely imitates a real baseball match, visually, from the viewpoint of a player controlling a batter character, compared to a conventional game device. In other words, according to one type of conventional game device, a state is provided wherein a cursor representing a bat and a cursor representing a ball are displayed together on a screen, and when the ball has been pitched, an operation for matching the position of the bat cursor with the position of the ball cursor is implemented, whereupon a swing is started by operating a particular switch button. Since a device of this type requires an operation for matching the two cursors on the screen, there has been a problem in that the game has been lacking in realism.

By contrast, in the game device according to the present embodiment, only the ball pitched by the pitcher character and the bat swung by the batter character are displayed as objects relating to the pitcher character and the batter character, when a ball is pitched. Therefore, the player operating the batter character controls the swing point by predicting the pitching ability, pitch type preferences, and the like, of the pitcher character, and he or she also controls the swing point by observing the momentary path of the pitched ball on the screen. Moreover, the swing point is not displayed on the screen. The swing point determines the path of the bat and corresponds to the instantaneous decision regarding where to aim the bat taken by a player in a real baseball match.

Therefore, the hitting control method used in the game device according to the present embodiment is able to provide a sense of control which imitates the sensation of a real baseball match more closely than a conventional game device.

In the embodiment described above, the size of the homing region was altered according to the level of difficulty of the game and the hitting capability (skilled hitting ability) of each individual batter, but it is also possible to use only one or other of these factors in the homing method relating to the present invention.

Moreover, the shape of the object regions does not necessarily have to be circular, as described above, and may be quadrilateral, pentagonal, or the like.

Furthermore, in the foregoing embodiment, skilled hitting ability was used as the parameter of the batter's hitting capability for adjusting the size of the object regions, but besides this, the hitting rate, long hitting ability, or the like, may be used, independently or in combination with each other.

Moreover, the homing method based on a variable homing region of this kind may be applied not only to a baseball game, but also to game devices for playing ball games, such as cricket, softball, table tennis, soccer, volleyball, tennis, badminton, golf, or the like, or other sports games resembling these ball games. Moreover, in a vehicle-based game, this method can also be applied to a case where the degree of impact between a vehicle and surrounding objects is altered according to whether the driver of the vehicle has set a good or bad course, for example, an inside course or outside course on a bend, a hairpin corner, or the like. Moreover, the moving object involved may be a ball, arrow, vehicle, or the like.

In the first and second embodiments, by introducing a program and data for a baseball game, or the like, into a computer system as described above, that system becomes a game device for a baseball game, or the like. Programs and data (game software) are generally stored and supplied on a ROM cartridge, CD-ROM, floppy disk, or the like, but it is also possible to use an information storage medium such as a DVD-ROM, HDD (hard disk), or the like. Moreover, if game software is downloaded from a database via a communications network using PC communication, the Internet, cable television, or the like, then this network is equivalent to the aforementioned information storage medium.

As described above, in a game device according to the present invention, for example, a baseball game device, since a bad course or good course selected by the batter is reflected in the result of the hit, it is possible to play a game which imitates real baseball more closely.

Moreover, if the game device according to the present invention is applied to a baseball game device, for example, then the impact between a pitched ball and a moving object can be made to correspond to the hitting capability of the batter and the level of difficulty of the game, thereby making it possible to provide a batting sensation which imitates the skill involved in a real baseball match more closely, and hence improving realism and diversity in the game.

What is claimed is:

1. A game device for simulating baseball, whereby a batter hits a ball pitched by a pitcher, with a bat, these actions being displayed on a screen, comprising:

storage means for storing data relating to good hitting courses and bad hitting courses for each batter;

pitch calculating means for calculating the path of a ball pitched by said pitcher;

hit position specifying means for specifying the hit position of said batter;

swing start instructing means for instructing a swing of said bat;

judging means for judging the degree of suitability of the hitting course set by said hitter at said specified hitting position, on the basis of said data;

impact judgment region determining means for defining an impact judgment region in accordance with the degree of suitability of the hitting course at said hitting position; and impact judging means for judging the impact between said ball and said bat on the basis of the path of said ball, said hitting position, said impact region and the timing of said swing.

2. The game device according to claim 1, wherein said impact judgment region determining means determines the size of said impact judgment region in accordance with the degree of suitability of said hitting course.

3. The game device according to claim 1, wherein said impact judgement region comprises a central stable hit region and a possible hit region formed surrounding same, and said impact judgement region determining means determines the width of said stable hit region according to the degree of suitability of said hitting course.

4. The game device according to claim 1 or claim 2, wherein said storage means expresses the region of a good or bad hitting course relating to a batter as an approximately square-shaped region, and this approximately square-shaped region is represented by positional data for two mutually opposing vertices thereof.

5. The game device according to claim 1 or 2, wherein said storage means expresses the region of a good or bad hitting course relating to said batter as an approximate polygonal region or an approximately circular shape.

6. The game device according to claim 1, wherein said storage means expresses the region of a good or bad hitting course relating to a batter as an approximately square-shaped region, and this approximately square-shaped region is represented by positional data for two mutually opposing vertices thereof;

wherein said storage means expands or contracts the outer edges of said region of a good or bad hitting course, according to the hitting performance of said batter.

7. An impact judgment method for a game device for simulating baseball, whereby a batter hits a ball pitched by a pitcher, with a bat, these actions being displayed on a screen, comprising the steps of:

calculating the path of a ball pitched by said pitcher;

specifying the hit position of said batter;

instructing a swing of said bat;

judging the degree of suitability of the hitting course set by said hitter at said specified hitting position, on the basis of previously stored data for said batter;

defining the size of an impact judgment region in accordance with the degree of suitability of the hitting course at said hitting position; and judging the impact between said ball and said bat on the basis of the path of said ball, said hitting position, said impact region and the timing of said swing.

8. An impact judgment method for a game device for simulating a game whereby a second player hits a moving object launched by a first player, with a hitting implement, these actions being displayed on a screen, comprising the steps of:

calculating the path of the moving object launched by said first player;

specifying the hitting position of said second player;

instructing the start of a swing of said hitting implement;

determining the degree of suitability of the hitting course set by said second player at said specified hitting position, on the basis of data relating to said second player;

determining the size of an impact judgment region according to the degree of suitability of the hitting course at said hitting position; and judging the impact between said moving object and said hitting implement, on the basis of the path of said moving object, said hitting position, said impact region, and the timing of said swing.

9. The impact judgment method for a game device according to claim 8, wherein said hitting implement is any one of, at least, a bat, a racket, a club, a board, a pole, or said second player's foot, head, or arm.

10. An information storage medium for storing a program for causing a computer system to perform a method to simulate baseball, whereby a batter hits a ball pitched by a pitcher, with a bat, the method comprising:

storing data relating to good hitting courses and bad hitting courses for each batter;

calculating the path of a ball pitched by said pitcher;

specifying the hit position of said batter;

instructing a swing of said bat;

judging the degree of suitability of the hitting course set by said hitter at said specified hitting position, on the basis of said data;

defining an impact judgment region in accordance with the degree of suitability of the hitting course at said hitting position; and judging the impact between said ball and said bat on the basis of the path of said ball, said hitting position, said impact region and the timing of said swing.

11. An information storage medium for storing a program for causing a computer system to perform a method to simulate baseball, whereby a batter hits a ball pitched by a pitcher, with a bat, the method comprising:

calculating the path of a ball pitched by said pitcher;

specifying the hit position of said batter;

instructing a swing of said bat;

judging the degree of suitability of the hitting course set by said hitter at said specified hitting position, on the basis of previously stored data for said batter;

defining the size of an impact judgment region in accordance with the degree of suitability of the hitting course at said hitting position; and judging the impact between said ball and said bat on the basis of the path of said ball, said hitting position, said impact region and the timing of said swing.

12. A game device for simulating baseball, whereby a batter hits a ball pitched by a pitcher with a bat, these actions being displayed on a screen, comprising:

storage means for storing data relating to good hitting courses and bad hitting courses for each batter;

pitch calculating means for calculating the path of a ball pitched by said pitcher;

hit position specifying means for specifying the hit position of said batter;

swing start instructing means for instructing a swing of said bat;

judging means for judging the degree of suitability of the hitting course set by said hitter at said specified hitting position, on the basis of said data;

impact judgement region determining means for defining an impact judgement region in accordance with the degree of suitability of the hitting course at said hitting position; and impact judging means for judging the impact between said ball and said bat on the basis of the path of said ball, said hitting position, said impact region and the timing of said swing;

wherein said storage means expresses the region of a good or bad hitting course relating to said batter as an approximate polygonal region or an approximately circular shape; and wherein said storage means expands or contracts the outer edges of said region of a good or bad hitting course, according to the hitting performance of said batter.

13. An information storage medium for storing a program for causing a computer system to perform a method to simulate a game, whereby a second player hits a moving object launched by a first player, with a hitting implement, the method comprising:

calculating a path of the moving object launched by said first player;

specifying a hitting position of said second player;

instructing starting a swing of said hitting implement;

determining a degree of suitability of a hitting course set by said second player at said specified hitting position, on the basis of data relating to said second player;

determining a size of an impact judgment region according to the degree of suitability of the hitting course at said hitting position; and judging an impact between said moving object and said hitting implement on the basis of the path of said moving object, said hitting position, said impact region and timing of said swing.

* * * * *